(12) United States Patent
Hotta et al.

(10) Patent No.: US 11,251,436 B2
(45) Date of Patent: Feb. 15, 2022

(54) SECONDARY BATTERY, BATTERY PACK, VEHICLE, AND STATIONARY POWER SUPPLY

(71) Applicant: KABUSHIKI KAISHA TOSHIBA, Minato-ku (JP)

(72) Inventors: Yasuyuki Hotta, Tokyo (JP); Shinsuke Matsuno, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 191 days.

(21) Appl. No.: 16/778,026

(22) Filed: Jan. 31, 2020

(65) Prior Publication Data
US 2020/0168913 A1     May 28, 2020

Related U.S. Application Data

(63) Continuation of application No. PCT/JP2019/007588, filed on Feb. 27, 2019.

(30) Foreign Application Priority Data

Sep. 13, 2018 (JP) .............................. JP2018-171780
Feb. 21, 2019 (JP) .............................. JP2019-029771

(51) Int. Cl.
*H01M 4/66*     (2006.01)
*H01M 10/0525*  (2010.01)
(Continued)

(52) U.S. Cl.
CPC ............. *H01M 4/668* (2013.01); *B60L 50/61* (2019.02); *H01M 10/0525* (2013.01);
(Continued)

(58) Field of Classification Search
None
See application file for complete search history.

(56) References Cited

U.S. PATENT DOCUMENTS 6,403,253 B1   6/2002  Wainwright et al.
10,079,390 B2  9/2018  Matsuno et al.
(Continued)

FOREIGN PATENT DOCUMENTS

EP   3 352 267 A1   7/2018
JP   09-508490 A    8/1997
(Continued)

OTHER PUBLICATIONS

International Search Report dated Jun. 5, 2019 in PCT/JP2019/007588 filed on Feb. 27, 2019, citing documents AI-AK & BT-BV therein, 4 pages.
(Continued)

*Primary Examiner* — Wyatt P McConnell
(74) *Attorney, Agent, or Firm* — Oblon, McClelland, Maier & Neustadt, L.L.P.

(57) ABSTRACT

According to one embodiment, there is provided a secondary battery including a positive electrode, a negative electrode, and an aqueous electrolyte. The positive electrode includes a positive electrode active material. The negative electrode includes a negative electrode active material and an additive resin containing a hydroxyl group unit and a first unit. The first unit consists of at least one of a butyral unit and an acetal unit. A content ratio of a content of the first unit contained in the additive resin to a content of the hydroxyl group unit contained in the additive resin is in a range of 1.2 to 18.

14 Claims, 7 Drawing Sheets

(51) Int. Cl.
*H01M 10/42* (2006.01)
*B60L 50/61* (2019.01)
*H01M 50/20* (2021.01)
*H01M 4/02* (2006.01)

(52) U.S. Cl.
CPC ......... *H01M 10/425* (2013.01); *H01M 50/20* (2021.01); *H01M 2004/027* (2013.01); *H01M 2004/028* (2013.01)

(56) References Cited

U.S. PATENT DOCUMENTS

| | | |
|---|---|---|
| 10,461,370 B2 | 10/2019 | Hotta et al. |
| 2011/0068001 A1 | 3/2011 | Affinito et al. |
| 2012/0251891 A1 | 10/2012 | Li et al. |
| 2014/0079994 A1 | 3/2014 | Affinito et al. |
| 2014/0234726 A1 | 8/2014 | Christensen et al. |
| 2015/0111110 A1 | 4/2015 | Watanabe et al. |
| 2015/0188193 A1* | 7/2015 | Kodama ........... H01M 10/0525 429/188 |
| 2017/0271717 A1 | 9/2017 | Yamashita et al. |
| 2018/0269538 A1 | 9/2018 | Hotta et al. |
| 2019/0013522 A1 | 1/2019 | Morita et al. |

FOREIGN PATENT DOCUMENTS

| | | |
|---|---|---|
| JP | 2000-077073 A | 3/2000 |
| JP | 2002-117857 A | 4/2002 |
| JP | 2003-017057 A | 1/2003 |
| JP | 2005-071807 A | 3/2005 |
| JP | 2013-232284 A | 11/2013 |
| JP | 2015-032535 A | 2/2015 |
| JP | 2016-046188 A | 4/2016 |
| JP | 2016-512649 A | 4/2016 |
| JP | 2016-173956 A | 9/2016 |
| JP | 2017-027944 A | 2/2017 |
| JP | 2017-174809 A | 9/2017 |
| JP | 2017-174810 A | 9/2017 |
| JP | 2018-045966 A | 3/2018 |
| JP | 2018-156926 A | 10/2018 |
| JP | 2020-43034 A | 3/2020 |
| WO | WO 2017/135323 A1 | 8/2017 |
| WO | WO 2020/054107 A1 | 3/2020 |

OTHER PUBLICATIONS

Written Opinion dated Jun. 5, 2019 in PCT/JP2019/007588 filed on Feb. 27, 2019, 6 pages.
Liu, S, et al., "Rechargeable Aqueous Lithium-Ion Battery of $TiO_2/LiMn_2O_4$ with a High Voltage", Journal of the Electrochemical Society, 158 (12), 2011, pp. A1490-A1497.

* cited by examiner

SECONDARY BATTERY, BATTERY PACK, VEHICLE, AND STATIONARY POWER SUPPLY

CROSS-REFERENCE TO RELATED APPLICATIONS

This application is a Continuation Application of PCT Application No. PCT/JP2019/007588, filed Feb. 27, 2019 and based upon and claiming the benefit of priority from Japanese Patent Applications No. 2018-171780, filed Sep. 13, 2018; and No. 2019-029771, filed Feb. 21, 2019, the entire contents of all of which are incorporated herein by reference.

FIELD

Embodiments described herein relate generally to a secondary battery, a battery pack, a vehicle and a stationary power supply.

BACKGROUND

A nonaqueous electrolyte battery such as a lithium ion secondary battery is used as a power supply in a broad field. The forms of nonaqueous electrolyte batteries include many different forms from small batteries for various kinds of electronic devices and the like to large batteries for electric vehicles and the like.

A nonaqueous electrolyte battery includes a negative electrode containing a negative electrode active material, a positive electrode containing a positive electrode active material, a separator, and a nonaqueous electrolyte. As the negative electrode active material, for example, a carbon material or a lithium titanium oxide is used. As the positive electrode active material, for example, a layered oxide containing nickel, cobalt, manganese, and the like is used. As the separator, for example, a porous film made of a resin or a nonwoven fabric is used.

As the nonaqueous electrolyte, a liquid nonaqueous electrolyte obtained by dissolving an electrolyte salt in a nonaqueous solvent can be used. As the nonaqueous solvent, for example, a mixture of ethylene carbonate and methyl ethyl carbonate or the like is used. The nonaqueous electrolyte has high oxidation resistance and high reduction resistance, and electrolysis of the solvent hardly occurs. For this reason, the nonaqueous electrolyte battery can implement a high electromotive force and excellent charge-and-discharge performance. However, since many nonaqueous solvents are combustible materials, the nonaqueous electrolyte battery needs various measures to improve safety.

Here, as the electrolyte, an aqueous electrolyte obtained by dissolving an electrolyte salt in an aqueous solvent is known. Examples of a battery using the aqueous electrolyte are a nickel/hydrogen battery and a lead storage battery. In general, the aqueous solvent does not have combustibility. Hence, when the aqueous electrolyte is used, a battery having high safety can be obtained as compared to a case in which a nonaqueous electrolyte is used.

However, water contained in the aqueous solvent has a narrow potential window, as compared to a nonaqueous solvent. The potential window is related to electrolysis of the solvent. For this reason, in the aqueous electrolyte battery, the potential range in which charge-and-discharge are executed needs to be limited to a potential range in which electrolysis of water does not occur. Hence, the aqueous electrolyte battery has a problem that sufficient energy density cannot be easily obtained, and the charge-and-discharge efficiency is low, as compared to the nonaqueous electrolyte battery.

DETAILED DESCRIPTION

Figure 1:
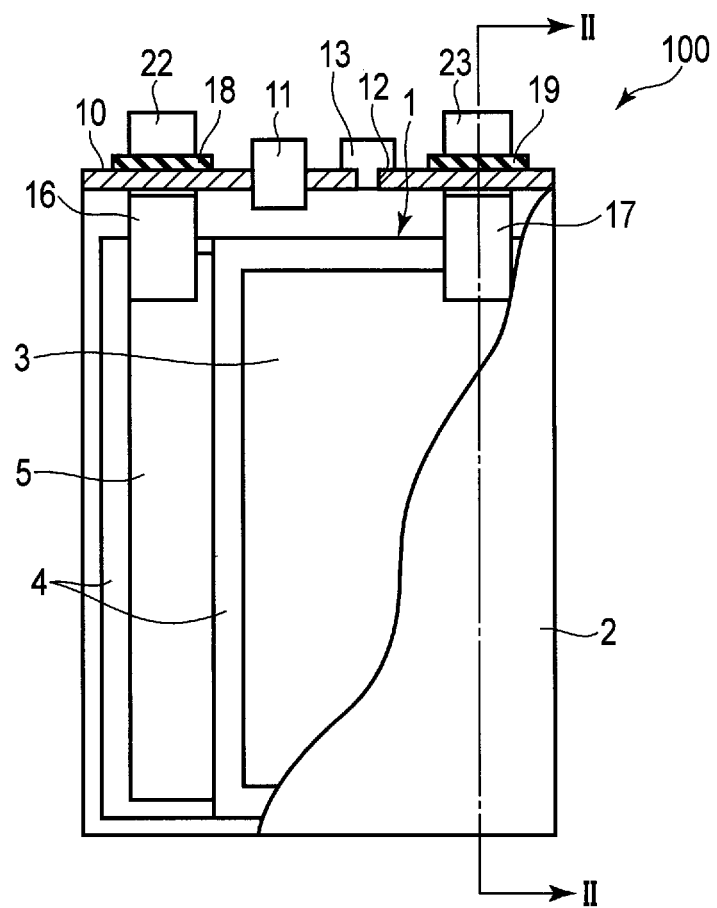
FIG. 1 is a cross-sectional view schematically showing an example of a secondary battery according to a first embodiment.

According to one embodiment, there is provided a secondary battery including a positive electrode, a negative electrode, and an aqueous electrolyte. The positive electrode includes a positive electrode active material. The negative electrode includes a negative electrode active material and an additive resin containing a hydroxyl group unit and a first unit. The first unit consists of at least one of a butyral unit and an acetal unit. A content ratio of a content of the first unit contained in the additive resin to a content of the hydroxyl group unit contained in the additive resin is in the range of 1.2 to 18.

Another embodiment provides a battery pack including the secondary battery according to the embodiment.

Another embodiment provides a vehicle including the battery pack according to the embodiment.

Another embodiment provides a stationary power supply including the battery pack according to the embodiment.

Hereinafter, embodiments will be described with reference to the drawings as appropriate. The same reference numerals are assigned to the common components throughout embodiments, and overlapping explanation thereof is omitted. The respective drawings are schematic views for promoting the explanation and understanding of the embodiments. Therefore, although the shapes, dimensions, and ratios of the components may be different from those in actual apparatuses, their design may be appropriately changed in consideration of the following explanation and known techniques.

First Embodiment

A secondary battery according to the first embodiment includes a positive electrode, a negative electrode, and an aqueous electrolyte. The positive electrode includes a positive electrode active material. The negative electrode includes a negative electrode active material and an additive resin containing a hydroxyl group unit and a first unit. The first unit consists of at least one of a butyral unit and an acetal unit. A content ratio of a content of the first unit contained in the additive resin to a content of the hydroxyl group unit contained in the additive resin is in the range of 1.2 to 18.

In the present specification, a resin which contains a hydroxyl group unit, and a first unit consisting of at least one of a butyral unit and an acetal unit, and in which the content ratio of the content of the butyral unit and the acetal unit (the content of the first unit) to the content of the hydroxyl group unit is in the range of 1.2 to 18, is referred to as the "additive resin". The additive resin will be described later in detail. The hydroxyl group unit may be referred to as a "second unit".

In the negative electrode of the secondary battery containing the aqueous electrolyte, electrolysis of water tends to occur because hydrogen overvoltage is low. The electrolysis of water is represented by the following formula (1).

$$2H_2O \rightarrow H_2 + 2OH^- \qquad (1)$$

The negative electrode included in the secondary battery according to the embodiment contains the additive resin which contains the first unit consisting of at least one of the butyral unit and the acetal unit, and a hydroxyl group unit, and in which the content ratio of the content of the first unit to the content of the hydroxyl group unit is in the range of 1.2 to 18. When the negative electrode contains the additive resin, the negative electrode becomes more hydrophobic as compared with a case where the additive resin is not contained. For example, the contact angle of the negative electrode with respect to water increases. As a result, since electrolysis of water in the negative electrode is suppressed, the charge-and-discharge efficiency is excellent. Further, when the negative electrode contains the additive resin, it is possible to inhibit the contact of water with the negative electrode, so that self-discharge can be suppressed in a high state of charge (SOC: State of Charge).

If electrolysis of water occurs, hydrogen is generated as shown in the above formula (1). When the amount of hydrogen generated inside a negative electrode active material-containing layer is large, components constituting the negative electrode active material-containing layer are likely to peel off from each other. When the components constituting the negative electrode active material-containing layer peel off from each other, electrode cracking occurs, for example. As a result, the lifetime of the secondary battery is shortened.

Since the negative electrode according to the embodiment contains the additive resin, as described above, the contact of water with the negative electrode is inhibited, and generation of hydrogen can be suppressed. Thus, occurrence of electrode cracking can be prevented. That is, the secondary battery according to the embodiment has a long life.

In addition, the resin containing the first unit including at least one of the butyral unit and the acetal unit, and the hydroxyl group unit can bind a plurality of particles with high peeling strength. That is, the resin containing the first unit and the hydroxyl group unit has good binding properties. This also contributes to prolonging the life of the secondary battery.

The additive resin is, for example, a vinyl copolymer containing the first unit including at least one of the butyral unit and the acetal unit, and the hydroxyl group unit, as copolymerization components. The additive resin may include both the butyral unit and the acetal unit. The additive resin may further contain an acetyl group unit. The additive resin may be a thermoplastic resin. Increasing the content of the first unit in the additive resin increases hydrophobicity of the resin. Thus, in order to suppress the electrolysis of water, the content of the first unit in the additive resin is preferably high. That is, it is preferable that the content ratio of the content of the first unit in the additive resin to the content of the hydroxyl group unit is relatively high. However, if the content ratio is excessively high, binding properties are lowered due to the low content of the hydroxyl group, which is not preferable. On the other hand, if the content ratio is excessively low, the water resistance of the electrode is lowered, and the electrolysis of water tends to occur, so that electrochemical characteristics of the battery tend to deteriorate.

The content ratio of the content of the first unit contained in the additive resin to the content of the hydroxyl group unit (the content ratio of the first unit including at least one of the butyral unit and the acetal unit/the content of the hydroxyl group unit) is in the range of 1.2 to 18. This ratio is preferably in the range of 1.5 to 10. The ratio is more preferably in the range of 1.6 to 2.8. When the negative electrode contains an additive resin in which the ratio is in the range of 1.2 to 18, it is possible to obtain a secondary battery excellent in charge-and-discharge efficiency, self-discharge characteristics, and long-life characteristics.

The vinyl copolymer as the additive resin contains, for example, the first unit including at least one of the butyral unit and the acetal unit, the second unit including the hydroxyl group unit, and a third unit including the acetyl group unit. The form of copolymerization of the vinyl copolymer is not particularly limited. The vinyl copolymer may be, for example, an alternating copolymer, a random copolymer, or a block copolymer.

The vinyl copolymer preferably contains the first unit in an amount of 60 mol % or more. In the vinyl copolymer, the content of the first unit is, for example, 90 mol % or less.

The vinyl copolymer preferably contains the hydroxyl group unit in an amount of 40 mol % or less. When the content of the hydroxyl group unit exceeds 40 mol %, the water resistance of the electrode is lowered, and the electrolysis of water tends to occur, so that electrochemical characteristics of the battery tend to deteriorate. In the vinyl copolymer, the content of the hydroxyl group unit is, for example, 10 mol % or more.

The vinyl copolymer may contain a monomer unit (fourth unit) other than a butyral unit, an acetal unit, a hydroxyl group unit, and an acetyl group unit. The vinyl copolymer may contain the monomer unit other than a butyral unit, an acetal unit, a hydroxyl group unit, and an acetyl group unit in an amount of, for example, 10 mol % or less.

Examples of vinyl copolymers as additive resins include polyvinyl butyral (PVB) resin and polyvinyl acetal (PVA) resin. The additive resin is preferably at least one selected from the group consisting of a polyvinyl butyral resin satisfying the above content ratio and a polyvinyl acetal resin satisfying the content ratio.

The polyvinyl butyral resin contains, for example, a butyral unit in an amount of 54 mol % to 90 mol %, a hydroxyl group unit in an amount of 5 mol % to 45 mol %, and an acetyl group unit in an amount of 1 mol % to 8 mol %. The polyvinyl butyral resin preferably contains a butyral unit in an amount of 60 mol % to 80 mol %, a hydroxyl group unit in an amount of 10 mol % to 38 mol %, and an acetyl group unit in an amount of 1 mol % to 8 mol %.

The polyvinyl acetal resin contains, for example, an acetal unit in an amount of 54 mol % to 90 mol %, a hydroxyl group unit in an amount of 5 mol % to 45 mol %, and an acetyl group unit in an amount of 1 mol % to 8 mol %. The polyvinyl acetal resin preferably contains an acetal unit in an amount of 60 mol % to 80 mol %, a hydroxyl group unit in an amount of 10 mol % to 38 mol %, and an acetyl group unit in an amount of 1 mol % to 8 mol %.

Each of the negative electrode and the positive electrode to be described later may contain a resin different from the additive resin. The resin different from the additive resin is referred to as "another resin". Examples of another resin include resins which do not contain both butyral units and acetal units, resins which do not contain hydroxyl group units, and resins which do not contain any of butyral units, acetal units, and hydroxyl group units. Another example of another resin includes a resin in which the content ratio of the content of the butyral unit and the acetal unit to the content of the hydroxyl group unit is not in the range of 1.2 to 18.

<Nuclear Magnetic Resonance Spectroscopy>

Whether or not the additive resin is contained in the negative electrode or the positive electrode of the secondary battery can be confirmed by a nuclear magnetic resonance spectroscopy (NMR). NMR can be carried out, for example, as follows.

First, the secondary battery is disassembled, and the electrode is extracted. The obtained electrode is sufficiently washed with water and then exposed to an organic solvent such as N-methyl-2-pyrrolidone (NMR), and the active material and a conductive agent are removed by centrifugation. The solution from which the active material and the conductive agent have been removed is reprecipitated with water to recover polymers (for example, additive resins). The recovered polymer is redissolved in deuterated dimethylsulfoxide. When $^1$H-NMR measurement is performed on a solution obtained by redissolution, the content of a butyral unit and an acetal unit contained in the polymer and the content of a hydroxyl group can be measured. Further, a composition ratio (composition ratio of a copolymer) of the recovered polymer can be specified by this measurement.

The weight of the additive resin recovered as described above is measured, and, at the same time, the weight of the active material is separately measured by the following method, whereby the ratio of the parts by weight of the additive resin to 100 parts by weight of the active material can be calculated. The weight of the active material is measured as follows. First, a small amount of the active material-containing layer on the current collector is scraped, and the weight of the scraped active material-containing layer is measured. Then, the scraped active material-containing layer is added to an acid such as hydrochloric acid to dissolve the active material in the acid. Then, the weight of the active material is calculated by subtracting the weight of components not dissolved in the acid from the weight of the scraped active material-containing layer. Examples of components not dissolved in an acid include a conductive agent and an additive resin.

Hereinafter, the secondary battery according to the embodiment will be described in detail.

The secondary battery according to the embodiment may further include a separator disposed between the positive electrode and the negative electrode. The positive electrode, the negative electrode, and the separator can constitute an electrode group. The aqueous electrolyte may be held in the electrode group. The secondary battery may further include a container member capable of storing the electrode group and the aqueous electrolyte. The secondary battery may further include a negative electrode terminal electrically connected to the negative electrode and a positive electrode terminal electrically connected to the positive electrode.

Hereinafter, the negative electrode, the positive electrode, the aqueous electrolyte, the separator, the container member, the negative electrode terminal, and the positive electrode terminal will be described in detail.

(1) Negative Electrode

The negative electrode may include a negative electrode current collector and a negative electrode active material-containing layer supported on one surface or both surfaces of the negative electrode current collector.

As the material of the negative electrode current collector, a substance that is electrochemically stable in the negative electrode potential range when the alkali metal ions are inserted or extracted is used. The negative electrode current collector is preferably, for example, an aluminum foil or an aluminum alloy foil containing at least one element selected from the group consisting of magnesium (Mg), titanium (Ti), zinc (Zn), manganese (Mn) iron (Fe), copper (Cu), and silicon (Si). The negative electrode current collector may have another form such as a porous body or a mesh. The thickness of the negative electrode current collector is preferably 5 μm ○ 50 μm. A current collector having such a thickness can balance the strength of the electrode and weight reduction.

The negative electrode current collector may include a portion where the negative electrode active material-containing layer is not formed on a surface of the negative electrode current collector. This portion can serve as a negative electrode tab.

The negative electrode active material-containing layer contains a negative electrode active material. The negative electrode active material-containing layer is disposed on at least one surface of the negative electrode current collector. For example, the negative electrode active material-containing layer may be disposed on one of the surfaces of the negative electrode current collector, and the negative electrode active material-containing layers may be arranged on one of the surfaces of the negative electrode current collector and the back surface thereof.

The porosity of the negative electrode active material-containing layer is preferably set to 20% to 50%. This makes it possible to obtain a negative electrode having good affinity for the aqueous electrolyte and having a high density. The porosity of the negative electrode active material-containing layer is more preferably 25% to 40%.

The porosity of the negative electrode active material-containing layer can be obtained by, for example, mercury porosimetry. More specifically, first, the pore distribution of the active material-containing layer is obtained by mercury porosimetry. Next, the total pore amount is calculated from the pore distribution. Next, the porosity can be calculated from the ratio of the total pore amount and the volume of the active material-containing layer.

As the negative electrode active material, a compound whose lithium ion insertion/extraction potential is 1 V (vs. Li/Li$^+$) to 3 V (vs. Li/Li$^+$) as a potential based on metal lithium can be used. That is, the secondary battery according to the first embodiment can maintain the hydrogen generation potential of the negative electrode in a low state after the initial charge, as described above. Hence, a material whose lithium ion insertion/extraction potential has a relatively small lower limit value can be used as the negative electrode active material of the secondary battery. When such a negative electrode active material is used, the energy density of the secondary battery can be raised. For this reason, the secondary battery can implement the same energy density as that of a battery using a nonaqueous electrolyte.

As the negative electrode active material, more specifically, a titanium oxide or a titanium-containing oxide can be used. As the titanium-containing oxide, a lithium titanium composite oxide, a niobium titanium composite oxide, a sodium niobium titanium composite oxide and the like can be used. One type or two or more types of the titanium oxide and the titanium-containing oxide can be included in the negative electrode active material.

The titanium oxide includes, for example, a titanium oxide having a monoclinic structure, a titanium oxide having a rutile structure, and a titanium oxide having an anatase structure. For titanium oxides of these crystal structures, the composition before charge can be expressed as $TiO_2$, and the composition after charge can be expressed as $Li_xTiO_2$ ($0 \leq x \leq 1$). In addition, the structure of titanium oxide having a monoclinic structure before charge can be expressed as $TiO_2(B)$.

The lithium titanium composite oxide includes, for example, a lithium titanium composite oxide having a spinel structure (for example, the general formula is $Li_{4+x}Ti_5O_{12}$ ($-1 \leq x \leq 3$)), a lithium titanium composite oxide having a ramsdellite structure (for example, $Li_{2+x}Ti_3O_7$ ($-1 \leq x \leq 3$)), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$), and the like. The lithium titanium composite oxide may be a lithium titanium composite oxide in which a dopant is introduced.

The niobium titanium composite oxides include, for example, a material expressed as $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, M is at least one element selected from the group consisting of Fe, V, Mo, and Ta).

The sodium titanium oxides include, for example, an orthorhombic Na-containing niobium titanium composite oxide represented by the general formula $Li_{2+v}Na_{2-w}M1_xTi_{6-y-z}Nb_yM2_zO_{14+\delta}$ ($0 \leq v \leq 4$, $0 \leq w < 2$, $0 \leq x < 2$, $0 \leq y < 6$, $0 \leq z < 3$, $-0.5 \leq \delta \leq 0.5$, M1 includes at least one element selected from the group consisting of Cs, K, Sr, Ba, and Ca, and M2 includes at least one element selected from the group consisting of Zr, Sn, V, Ta, Mo, W, Fe, Co, Mn, and Al).

As the negative electrode active material, the titanium oxide having the anatase structure, the titanium oxide having the monoclinic structure, the lithium titanium composite oxide having the spinel structure, or a mixture thereof is preferably used. When one of these oxides is used as the negative electrode active material and a lithium manganese composite oxide is used as the positive electrode active material, a high electromotive force can be obtained.

The negative electrode active material is contained in the negative electrode active material-containing layer in a form of, for example, particles. The negative electrode active material particles can be primary particles, secondary particles as the aggregates of primary particles, or a mixture of single primary particles and secondary particles. The shape of a particle is not particularly limited and can be, for example, spherical, elliptical, flat, or fibrous.

An average particle size (diameter) of primary particles of the negative electrode active material is preferably 3 μm or less and more preferably 0.01 μm or more and 1 μm or less. An average particle size (diameter) of secondary particles of the negative electrode active material is preferably 30 μm or less and more preferably 5 μm or more and 20 μm or less.

Each of the primary particle size and the secondary particle size means a particle size with which a volume integrated value becomes 50% in a particle size distribution obtained by a laser diffraction particle size distribution measuring apparatus. As the laser diffraction particle size distribution measuring apparatus, Shimadzu SALD-300 is used, for example. For measurement, luminous intensity distribution is measured 64 times at intervals of 2 seconds. As a sample used when performing the particle size distribution measurement, a dispersion obtained by diluting the negative electrode active material particles by N-methyl-2-pyrrolidone such that the concentration becomes 0.1 wt % to 1 wt % is used. Alternatively, a measurement sample obtained by dispersing 0.1 g of a negative electrode active material in 1 to 2 ml of distilled water containing a surfactant is used.

In addition to the negative electrode active material, the negative electrode active material-containing layer may contain a conductive agent, a binder, and the like. A conductive agent is added as necessary in order to increase the current-collecting performance and to suppress the contact resistance between the active material and the current collector. The binder has an function of binding the active material, the conductive agent, and the current collector.

Examples of the conductive agent include carbonaceous materials such as acetylene black, Ketjen black, graphite, and coke. The conductive agent may be of one type, or two or more types may be used in mixture.

The negative electrode may contain only one kind or two or more kinds of additive resins. For example, the negative electrode active material-containing layer contains an additive resin. When the negative electrode active material-containing layer contains an additive resin, for example, the additive resin covers at least a portion of the negative electrode active material particles. The negative electrode active material-containing layer may contain the aforementioned additive resin as a binder or as a surface covering material for the negative electrode active material particles. Alternatively, the aforementioned additive resin may be contained in both the binder of the negative electrode and the surface covering material for the negative electrode active material particles. When an additive resin is contained in both the binder of the negative electrode and the surface covering material of the negative electrode active material particles, a plurality of components constituting the negative electrode active material-containing layer can be bonded more strongly, so that long-life characteristics tend to be excellent. In the negative electrode active material-containing layer, only the binder may contain the additive resin, and only the surface covering material for the negative electrode active material particles may contain the additive resin.

In the negative electrode, a ratio of the part by weight of the additive resin to 100 parts by weight of the negative electrode active material is, for example, in the range of 0.1 part by weight to 3 parts by weight, preferably in the range of 0.5 part by weight to 2 parts by weight. When the ratio of the weight of the additive resin to the weight of the negative electrode active material is in this range, the additive resin does not excessively cover the surface of the negative electrode active material particles, so that excellent charge-and-discharge efficiency can be achieved.

The binder of the negative electrode may be formed of only the aforementioned additive resin. The binder may further contain another binder other than the additive resin. When the surfaces of the negative electrode active material particles is covered with the additive resin, the binder may be formed of only another binder. As another binder, at least one material selected from the group consisting of, for example, polytetrafluoroethylene (PTFE), polyvinylidene fluoride (PVdF), a cellulose based polymer such as carboxymethylcellulose (CMC), fluorine based rubber, styrene butadiene rubber, an acrylic resin or a copolymer thereof, polyacrylic acid, and polyacrylonitrile can be used. Another binder is not limited to these materials.

The mixing ratios of the conductive agent and the binder in the negative electrode active material-containing layer are preferably in a range of 1 part by weight or more and 20 parts by weight or less, and in a range of 0.1 part by weight or more and 10 parts by weight or less, respectively, with respect to 100 parts by weight of the active material. If the mixing ratio of the conductive agent is 1 part by weight or more, the conductivity of the negative electrode can be improved. If the mixing ratio of the conductive agent is 20 parts by weight or less, decomposition of the aqueous electrolyte on the conductive agent surface can be reduced. When the mixing ratio of the binder is 0.1 part by weight or more, sufficient electrode strength is obtained, and when the mixing ratio of the binder is 10 parts by weight or less, an insulating portion of the electrode can be decreased.

The negative electrode can be obtained by, for example, the following method. First, the active material, the conductive agent, and the binder are suspended in an appropriate solvent to prepare a slurry. Next, the slurry is applied to one surface or both surfaces of the current collector. The coating on the current collector is dried, thereby forming an active material-containing layer. After that, pressing is performed for the current collector and the active material-containing layer formed on it. As the active material-containing layer, the mixture of the active material, the conductive agent, and the binder formed into pellets may be used.

When the negative electrode is produced, as the active material, active material particles in which at least a portion of the surfaces is previously covered with the additive resin may be used. As a method of covering at least a portion of the surfaces of the active material particles with the additive resin, for example, the following methods can be mentioned. First, an ethanol solution or an N-methyl-2-pyrrolidone (NMP) solution containing a vinyl copolymer as an additive resin at a concentration of 0.01 wt % to 0.1 wt % is provided. Subsequently, the active material particles are added to the provided solution and sufficiently stirred. After that, the active material particles are isolated by centrifugal separation operation or the like to obtain active material particles in which at least a portion of the particles surfaces is covered with the additive resin.

(2) Positive Electrode

The positive electrode can include a positive electrode current collector and a positive electrode active material-containing layer supported on the positive electrode current collector.

The positive electrode current collector is made of, for example, a metal such as stainless steel, aluminum (Al), or titanium (Ti). The positive electrode current collector has a form of, for example, a foil, a porous body, or a mesh. To prevent corrosion by the reaction between the positive electrode current collector and the aqueous electrolyte, the surface of the positive electrode current collector may be covered with a different kind of element. The positive electrode current collector is preferably made of a material with excellent corrosion resistance and oxidation resistance, for example, a Ti foil. Note that when $Li_2SO_4$ is used as the aqueous electrolyte, Al may be used as the positive electrode current collector because corrosion does not progress.

The positive electrode active material-containing layer contains the positive electrode active material. The positive electrode active material-containing layer may be supported on each main surface of the positive electrode current collector. As the positive electrode active material, a compound whose lithium ion insertion/extraction potential is 2.5 V (vs. Li/Li$^+$) to 5.5 V (vs. Li/Li$^+$) as a potential based on metal lithium can be used. The positive electrode may contain one type of positive electrode active material or may contain two or more types of positive electrode active materials.

Examples of the positive electrode active material include a lithium manganese composite oxide, a lithium nickel composite oxide, a lithium cobalt aluminum composite oxide, a lithium nickel cobalt manganese composite oxide, a spinel type lithium manganese nickel composite oxide, a lithium manganese cobalt composite oxide, a lithium iron oxide, a lithium fluorinated iron sulfate, a phosphate compound having an olivine crystal structure (for example, $Li_xFePO_4$ (0<x≤1), $Li_xMnPO_4$ (0<x≤1)), and the like. The phosphate compound having an olivine crystal structure has excellent thermal stability.

Examples of the positive electrode active material capable of obtaining a high positive electrode potential are a lithium manganese composite oxide having a spinel structure such as $Li_xMn_2O_4$ (0<x≤1) or $Li_xMnO_2$ (0<x≤1), a lithium nickel aluminum composite oxide such as $Li_xNi_{1-y}Al_yO_2$ (0<x≤1, and 0<y<1), a lithium cobalt composite oxide such as $Li_xCoO_2$ (0<x≤1), a lithium nickel cobalt composite oxide such as $Li_xNi_{1-y-z}Co_yMn_zO_2$ (0<x≤1, 0<y<1, and 0≤z<1), a lithium manganese cobalt composite oxide such as $Li_xMn_yCo_{1-y}O_2$ (0<x≤1, and 0<y<1), a spinel type lithium manganese nickel composite oxide such as $Li_xMn_{1-y}Ni_yO_4$ (0<x≤1, 0<y<2, and 0<1−y<1), a lithium phosphorus oxide such as having an olivine structure such as $Li_xFePO_4$ (0<x≤1), $Li_xFe_{1-y}Mn_yPO_4$ (0<x≤1, 0≤y≤1), or $Li_xCoPO_4$ (0<x≤1), and a fluorinated iron sulfate (for example, $Li_xFeSO_4F$ (0<x≤1)).

The positive electrode active material is preferably at least one material selected from the group consisting of a lithium cobalt composite oxide, a lithium manganese composite oxide, and a lithium phosphorus oxide having an olivine structure. The operating potentials of these active materials are 3.5 V (vs. Li/Li$^+$) to 4.2 V (vs. Li/Li$^+$). That is, the operating potentials of these active materials are relatively high. When these positive electrode active materials are used in combination with the above-described negative electrode active material such as a spinel type lithium titanate or an anatase type titanium oxide, a high battery voltage can be obtained.

The positive electrode active material is contained in the positive electrode in a form of, for example, particles. The positive electrode active material particles can be single primary particles, secondary particles as the aggregates of primary particles, or a mixture of primary particles and secondary particles. The shape of a particle is not particularly limited and can be, for example, spherical, elliptical, flat, or fibrous.

The average particle size (diameter) of the primary particles of the positive electrode active material is preferably 10 μm or less, and more preferably 0.1 μm to 5 μm. The average particle size (diameter) of the secondary particles of the positive electrode active material is preferably 100 μm or less, and more preferably 10 μm to 50 μm.

The primary particle size and the secondary particle size of the positive electrode active material can be measured by the same method as that for the negative electrode active material particles.

In addition to the positive electrode active material, the positive electrode active material-containing layer may contain a conductive agent, a binder, and the like. A conductive agent is added as necessary in order to increase the current-collecting performance and to suppress the contact resistance between the active material and the current collector. The binder has an action of binding the active material, the conductive agent, and the current collector.

Examples of the conductive agent include carbonaceous materials such as acetylene black, Ketjen black, graphite, and coke. The conductive agent may be of one type, or two or more types may be used in mixture.

The positive electrode may contain the aforementioned additive resin. The positive electrode may contain only one kind or two or more kinds of additive resins. For example, the positive electrode active material-containing layer may contain an additive resin. Since the additive resin can favorably bind components in the positive electrode active material-containing layer, if the positive electrode contains the additive resin, it is possible to suppress electrode cracking and the like when oxygen is generated in the positive electrode. As a result, life characteristics may be improved. When the positive electrode active material-containing layer contains an additive resin, for example, the additive resin covers at least a portion of the positive electrode active material particles. The positive electrode active material-containing layer may contain the aforementioned additive resin as a binder or as a surface covering material, for the positive electrode active material particles. Alternatively, the aforementioned additive resin may be contained in both the binder of the positive electrode and the surface covering material for the positive electrode active material particles. In the positive electrode active material-containing layer, only the binder may contain the additive resin, and only the surface covering material for the positive electrode active material particles may contain the additive resin.

In the positive electrode, a ratio of the part by weight of the additive resin to 100 parts by weight of the positive electrode active material is, for example, in the range of 0.1 part by weight to 3 parts by weight, preferably in the range of 0.5 part by weight to 2 parts by weight. When the ratio of the weight of the additive resin to the weight of the positive electrode active material is in this range, the additive resin does not excessively cover the surface of the positive electrode active material particles, so that excellent charge-and-discharge efficiency can be achieved.

The binder of the positive electrode may be formed of only the aforementioned additive resin. The binder may further contain another binder other than the additive resin. As another binder, for example, polytetrafluoroethylene (PTFE), polyvinylidene fluoride (PVdF), fluorine based rubber, ethylene butadiene rubber, polypropylene (PP), polyethylene (PE), carboxymethylcellulose (CMC), polyimide (PI), polyacrylimide (PAI), or the like can be used. The binder may be of one type, or two or more types may be used in mixture.

The mixing ratios of the conductive agent and the binder in the positive electrode active material-containing layer are preferably 0.1 part by weight or more and 20 parts by weight or less, and 0.5 part by weight or more and 10 parts by weight or less, respectively, with respect to 100 parts by weight of the active material. If the mixing ratio of the conductive agent is 3 parts by weight or more, the conductivity of the positive electrode can be improved. If the mixing ratio of the conductive agent is 20 parts by weight or less, decomposition of the aqueous electrolyte on the conductive agent surface can be reduced. When the mixing ratio of the binder is 0.5 part by weight or more, sufficient electrode strength is obtained, and when the mixing ratio of the binder is 10 parts by weight or less, an insulating portion of the electrode can be decreased.

The positive electrode can be obtained by, for example, the following method. First, the active material, the conductive agent, and the binder are suspended in an appropriate solvent to prepare a slurry. Next, the slurry is applied to one surface or both surfaces of the current collector. The coating on the current collector is dried, thereby forming an active material-containing layer. After that, pressing is performed for the current collector and the active material-containing layer formed on it. As the active material-containing layer, the mixture of the active material, the conductive agent, and the binder formed into pellets may be used.

When the positive electrode is produced, as the active material, active material particles in which at least a portion of the surfaces is previously covered with the additive resin may be used. For example, at least a portion of the surfaces of the active material particles can be covered with the additive resin by the same method as described for the negative electrode.

(3) Separator

A separator may be disposed between a positive electrode and a negative electrode. When the separator is constituted of an insulating material, electrical contact between the positive electrode and the negative electrode can be prevented. It is desirable to use a separator having a shape allowing an electrolyte to move between the positive electrode and the negative electrode. Examples of the separator include nonwoven fabrics, films, and paper. Examples of materials forming the separator include polyolefin, such as polyethylene and polypropylene, and cellulose. Preferable examples of the separator include nonwoven fabrics containing cellulose fibers and porous films containing polyolefin fibers. The porosity of the separator is preferably 60% or more. A fiber diameter is preferably 10 μm or less. When the fiber diameter is 10 μm or less, an affinity of the separator with an electrolyte is enhanced, so that battery resistance can be reduced. A more preferable range of the fiber diameter is 3 μm or less. In a cellulose fiber containing nonwoven fabric having a porosity of 60% or more, impregnation of an electrolyte is good, and high output performance can be exhibited from low temperature to high temperature. The separator does not react with a negative electrode in long term charged storage, float charging, and over-charge, and a short-circuit between the negative electrode and the positive electrode due to dendrite precipitation of lithium metal does not occur. A more preferable range is 62% to 80%.

It is preferable that the separator has a thickness of 20 μm to 100 μm and a density of 0.2 g/cm$^3$ to 0.9 g/cm$^3$. If the thickness and the density of the separator are in these ranges, mechanical strength and a reduction in battery resistance can be balanced, so that a secondary battery in which an internal short-circuit is suppressed by a high output can be provided. Heat shrinkage of the separator under a high temperature environment is small, and good high temperature storage performance can be exhibited.

As a separator, a solid electrolyte layer including solid electrolyte particles can also be used. The solid electrolyte layer may include one type of solid electrolyte particles or may include plural types of solid electrolyte particles. The solid electrolyte layer may be a solid electrolyte composite film including solid electrolyte particles. The solid electrolyte composite film is obtained by, for example, forming solid electrolyte particles into a film shape using a polymer binder. The solid electrolyte layer may contain at least one selected from the group consisting of a plasticizer and an electrolyte salt. When the solid electrolyte layer contains an electrolyte salt, for example, alkali metal ion conductivity of the solid electrolyte layer can be further enhanced.

Examples of a polymer binder include polyether type, polyester type, polyamine type, polyethylene type, silicone type and polysulfide type.

As the solid electrolyte, an inorganic solid electrolyte is preferably used. As the inorganic solid electrolyte, for example, an oxide-based solid electrolyte or a sulfide-based solid electrolyte can be used. As the oxide-based solid electrolyte, a lithium phosphate solid electrolyte having a NASICON structure and represented by a general formula $LiM_2(PO_4)_3$ is preferably used. M in the formula is preferably at least one element selected from the group consisting of titanium (Ti), germanium (Ge), strontium (Sr), zirconium (Zr), tin (Sn), and aluminum (Al). The element M preferably includes Al and one of Ge, Zr, and Ti.

Detailed examples of the lithium phosphate solid electrolyte having the NASICON structure include LATP ($Li_{1+x}Al_xTi_{2-x}(PO_4)_3$), $Li_{1+x}Al_xGe_{2-x}(PO_4)_3$, and $Li_{1+x}Al_xZr_{2-x}(PO_4)_3$. In the above formula, x falls within the range of 0<x≤5, x preferably falls within the range of 0<x≤2, x more preferably falls within the range of 0.1≤x≤0.5. As the solid electrolyte, LATP is preferably used. LATP is excellent in waterproofness and hardly causes hydrolysis in the secondary battery.

As the oxide-based solid electrolyte, LIPON ($Li_{2.9}PO_{3.3}N_{0.46}$) in an amorphous state or LLZ ($Li_7La_3Zr_2O_{12}$) having a garnet structure may be used.

As the solid electrolyte, a sodium containing solid electrolyte may be used. The sodium containing solid electrolyte is excellent in the ionic conductivity of sodium ions. As the sodium containing solid electrolyte, β-alumina, a sodium phosphorus sulfide, a sodium phosphorus oxide, or the like can be used. The sodium ions containing solid electrolyte preferably has a glass-ceramic form.

The ratio of the electrolyte salt in the solid electrolyte layer is preferably from 0.01 wt % to 10 wt %, and more preferably from 0.05 wt % to 5 wt %. The ratio of the electrolyte salt in the solid electrolyte layer can be calculated by thermogravimetry (TG) analysis.

Whether the solid electrolyte layer contains an electrolyte salt can be confirmed, for example, based on an alkali metal ion distribution obtained by energy dispersive X-ray spectrometry (EDX) for a section of the solid electrolyte layer. That is, if the solid electrolyte layer is made of a material that does not contain an electrolyte salt, the alkali metal ions remain in the surface layer of the polymeric material in the solid electrolyte layer, and therefore, rarely exist inside the solid electrolyte layer. Hence, a concentration gradient representing that the concentration of alkali metal ions is high in the surface layer of the solid electrolyte layer, and the concentration of alkali metal ions is low inside the solid electrolyte layer can be observed. On the other hand, if the solid electrolyte layer is made of a material containing an electrolyte salt, it can be confirmed that the alkali metal ions evenly exist inside the solid electrolyte layer as well.

Alternatively, if the electrolyte salt contained in the solid electrolyte layer and the electrolyte salt contained in the aqueous electrolyte are of different types, it can be found based on the difference of existing ions that the solid electrolyte layer contains an electrolyte salt different from that in the aqueous electrolyte. For example, when lithium chloride (LiCl) is used as the aqueous electrolyte, and LiTFSI (lithium bis(fluorosulfonyl)imide) is used as the solid electrolyte layer, the existence of (fluorosulfonyl)imide ions can be confirmed in the solid electrolyte layer. On the other hand, in the aqueous electrolyte, the existence of the (fluorosulfonyl)imide ions cannot be confirmed, or the (fluorosulfonyl)imide ions exist at a very low concentration.

As the electrolyte salt, a lithium salt, a sodium salt, or a mixture thereof is preferably used. One type or two or more types of electrolyte salts can be used.

As the lithium salt, for example, lithium chloride (LiCl), lithium bromide (LiBr), lithium hydroxide (LiOH), lithium sulfate ($Li_2SO_4$), lithium nitrate ($LiNO_3$), lithium acetate ($CH_3COOLi$), lithium oxalate ($Li_2C_2O_4$), lithium carbonate ($Li_2CO_3$), lithium bis(trifluoromethanesulfonyl)imide (LiTFSI: $LiN(SO_2CF_3)_2$) lithium bis(fluorosulfonyl)imide (LiFSI: $LiN(SO_2F)_2$), lithium bis(oxalate)borate (LiBOB: $LiB[(OCO)_2]_2$), or the like can be used.

As the sodium salt, for example, sodium chloride (NaCl), sodium sulfate ($Na_2SO_4$), sodium hydroxide (NaOH), sodium nitrate ($NaNO_3$), sodium trifluoromethanesulfonyl amide (NaTFSA), or the like can be used.

(4) Aqueous Electrolyte

The aqueous electrolyte contains an aqueous solvent and an electrolyte salt. The aqueous electrolyte is in the form of liquid, for example. The liquid aqueous electrolyte is an aqueous solution prepared by dissolving an electrolyte salt as a solute in the aqueous solvent.

As the electrolyte salt, for example, a lithium salt, a sodium salt, or a mixture thereof can be used. As the lithium salt or sodium salt, the same salt that can be contained in the solid electrolyte layer can be used. As the lithium salt, LiCl is preferably contained. When LiCl is used, the lithium ion concentration of the aqueous electrolyte can be made high. Additionally, the lithium salt preferably contains at least one of $LiSO_4$ and LiOH in addition to LiCl.

The mol concentration of lithium ions in the aqueous electrolyte is preferably 3 mol/L or more, more preferably 6 mol/L or more, and much more preferably 12 mol/L or more. When the concentration of the lithium ions in the aqueous electrolyte is high, electrolysis of the aqueous solvent in the negative electrode can easily be suppressed, and hydrogen generation from the negative electrode tends to be little.

In the aqueous electrolyte, the aqueous solvent amount is preferably 1 mol or more relative to 1 mol of the salt serving as a solute. In a more preferable form, the aqueous solvent amount relative to 1 mol of the salt serving as a solute is 3.5 mol or more.

The aqueous electrolyte preferably contains, as an anion species, at least one anion species selected from the group consisting of a chloride ion ($Cl^-$), a hydroxide ion ($OH^-$), a sulphate ion ($SO_4^{2-}$), and a nitrate ion ($NO_3^-$).

The pH of the aqueous electrolyte is preferably 3 to 14, and more preferably 4 to 13.

In addition, the pH of the aqueous electrolyte on the negative electrode side and that on the positive electrode side are preferably different after the initial charge. In the secondary battery after the initial charge, the pH of the aqueous electrolyte on the negative electrode side is preferably 3 or more, more preferably 5 or more, and much more preferably 7 or more. In the secondary battery after the initial charge, the pH of the aqueous electrolyte on the positive electrode side preferably falls within the range of 0 to 7, and more preferably falls within the range of 0 to 6.

The pHs of the aqueous electrolyte on the negative electrode side and the positive electrode side can be obtained by, for example, disassembling the secondary battery and measuring the pH of the aqueous electrolyte existing between the separator and the negative electrode and the pH of the aqueous electrolyte existing between the separator and the positive electrode.

As the aqueous solvent, a solution containing water can be used. Here, the solution containing water may be pure water, or may be a mixed solvent of water and an organic solvent. The aqueous solvent contains, for example, water at a ratio of 50 vol % or more.

The aqueous electrolyte may be a gel electrolyte. The gel electrolyte is prepared by mixing the above-described liquid aqueous electrolyte and a high-molecular compound and compounding them. As the high-molecular compound, for example, polyvinylidene fluoride (PVdF), polyacrylonitrile (PAN), polyethylene oxide (PEO), and the like can be used.

Whether the aqueous electrolyte contains water can be confirmed by GC-MS (Gas Chromatography-Mass Spectrometry). In addition, the salt concentration and water content in the aqueous electrolyte can be measured by, for example, ICP (Inductively Coupled Plasma) emission spectrometry. A predetermined amount of aqueous electrolyte is measured, and the concentrate of the contained salt is calculated, thereby calculating the mol concentration (mol/L). In addition, when the specific gravity of the aqueous electrolyte is measured, the number of moles in each of the solute and the solvent can be calculated.

(5) Container

As the container that stores the positive electrode, the negative electrode, and the aqueous electrolyte, a metal container, a laminated film container, or a resin container can be used.

As the metal container, a metal can made of nickel, iron, stainless steel, or the like and having a rectangular shape or a cylindrical shape can be used. As the resin container, a container made of polyethylene, polypropylene, or the like can be used.

The board thickness of each of the resin container and the metal container preferably falls within the range of 0.05 mm to 1 mm. The board thickness is more preferably 0.5 mm or less, and much more preferably 0.3 mm or less.

As the laminated film, for example, a multilayered film formed by covering a metal layer with a resin layer can be used. Examples of the metal layer include a stainless steel foil, an aluminum foil, and an aluminum alloy foil. As the resin layer, a polymer such as polypropylene (PP), polyethylene (PE), nylon, or polyethylene terephthalate (PET) can be used. The thickness of the laminated film preferably falls within the range of 0.01 mm to 0.5 mm. The thickness of the laminated film is more preferably 0.2 mm or less.

(6) Negative Electrode Terminal

The negative electrode terminal can be formed of a material which is electrochemically stable at the Li insertion/extraction potential of the above negative electrode active material and has conductivity. Specific examples of the material of the negative electrode terminal include copper, nickel, stainless steel and aluminum, and aluminum alloy containing at least one element selected from the group consisting of Mg, Ti, Zn, Mn, Fe, Cu, and Si. It is preferable to use aluminum or an aluminum alloy as the material of the negative electrode terminal. The negative electrode terminal is preferably formed of the same material as that of the negative electrode current collector in order to reduce the contact resistance with the negative electrode current collector.

(7) Positive Electrode Terminal

The positive electrode terminal can be formed of a material which is electrically stable in a potential range (vs. Li/Li$^+$) where the potential with respect to an oxidation-reduction potential of lithium is from 2.5 V to 5.5 V and has conductivity. Examples of the material of the positive electrode terminal include aluminum and aluminum alloy containing at least one element selected from the group consisting of Mg, Ti, Zn, Mn, Fe, Cu, and Si. The positive electrode terminal is preferably formed of the same material as that of the positive electrode current collector in order to reduce the contact resistance with the positive electrode current collector.

(8) Form of Secondary Battery.

The secondary battery according to the embodiment can be used in various forms such as a rectangular shape, a cylindrical shape, a flat type, a thin type, and a coin type. In addition, the secondary battery may be a secondary battery having a bipolar structure. The secondary battery having a bipolar structure is advantageous in producing a plurality of serial cells by one cell.

Next, the secondary battery according to the embodiment will be described in more detail with reference to the drawings.

Figure 2:
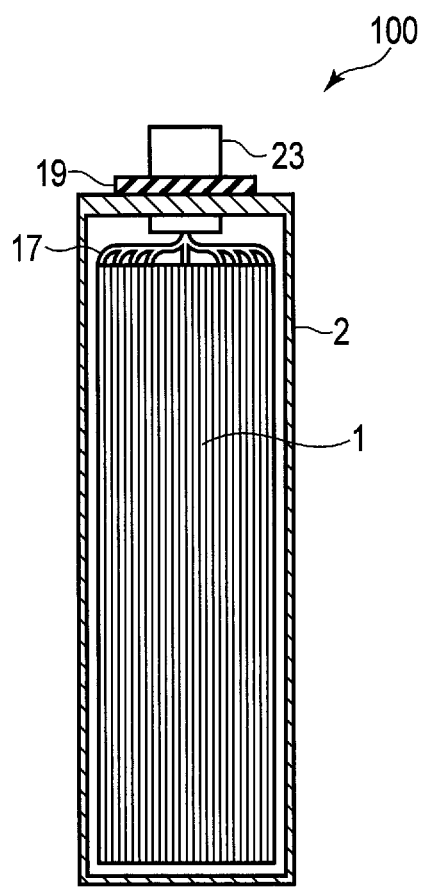
FIG. 2 is a cross-sectional view along line II-II of the secondary battery of FIG. 1.

FIG. 1 is a cross-sectional view schematically showing an example of the secondary battery according to the embodiment. FIG. 2 is a cross-sectional view along line II-II of the secondary battery of FIG. 1.

An electrode group 1 is stored in a rectangular tubular metal container 2. The electrode group 1 has a structure formed by spirally winding a positive electrode 5 and a negative electrode 3 with a separator 4 interposing therebetween so as to form a flat shape. An aqueous electrolyte (not shown) is held by the electrode group 1. As shown in FIG. 1, a strip-shaped positive electrode side lead 22 is electrically connected to each of a plurality of portions at an end of the positive electrode 5 located on an end face of the electrode group 1. In addition, a strip-shaped negative electrode side lead 23 is electrically connected to each of a plurality of portions at an end of the negative electrode 3 located on the end face. The plurality of positive electrode side leads 22 are electrically connected to a positive electrode tab 16 in a bundled state. In addition, the plurality of the negative electrode side leads 23 are electrically connected to a negative electrode tab 17 in a bundled state. A sealing plate 10 made of a metal is fixed to the opening portion of the metal container 2 by welding or the like. The positive electrode tab 16 and the negative electrode tab 17 are extracted to the outside from outlet holes provided in the sealing plate 10, respectively. The inner surface of each outlet hole of the sealing plate 10 is coated with an insulating member to avoid a short circuit caused by contact between the positive electrode tab 16 and the negative electrode tab 17.

As shown in FIG. 2, the other end of the negative electrode tab 17 has a strip shape and is electrically connected to each of a plurality of portions of the negative electrode 3 located on the upper end face of the electrode group 1. Although not illustrated, similarly, the other end of the positive electrode tab 16 has a strip shape and is electrically connected to each of a plurality of portions of the positive electrode 5 located on the upper end face of the electrode group 1.

Referring to FIG. 1, the sealing plate 10 made of a metal is fixed to the opening portion of the metal container 2 by welding or the like. The positive electrode side leads 22 and the negative electrode side leads 23 are extracted to the outside from outlet holes provided in the sealing plate 10, respectively. On the inner surfaces of the outlet holes of the sealing plate 10, positive electrode gaskets 18 and negative electrode gaskets 19 are arranged to avoid a short circuit caused by contact between the positive electrode side leads 22 and the negative electrode side leads 23. When the positive electrode gaskets 18 and the negative electrode gaskets 19 are arranged, the airtightness of the rectangular secondary battery 100 can be maintained.

A control valve 11 (safety valve) is arranged in the sealing plate 10. If the internal pressure of the battery cell is raised by a gas generated by electrolysis of the aqueous solvent, the generated gas can be released from the control valve 11 to the outside. As the control valve 11, for example, a return type valve that operates when the internal pressure exceeds a set value and functions as a sealing plug when the internal pressure lowers can be used. Alternatively, a non-return type valve that cannot recover the function as a sealing plug once it operates can be used. In the secondary battery 100 shown in FIG. 1, the control valve 11 is arranged near the center of the sealing plate 10. However, the position of the control valve 11 may be an end of the sealing plate 10. The control valve 11 may be omitted.

Additionally, a liquid pouring port 12 is provided in the sealing plate 10. The aqueous electrolyte can be poured via the liquid pouring port 12. The liquid pouring port 12 can be closed by a sealing plug 13 after the aqueous electrolyte is poured. The liquid pouring port 12 and the sealing plug 13 may be omitted.

Figure 3:
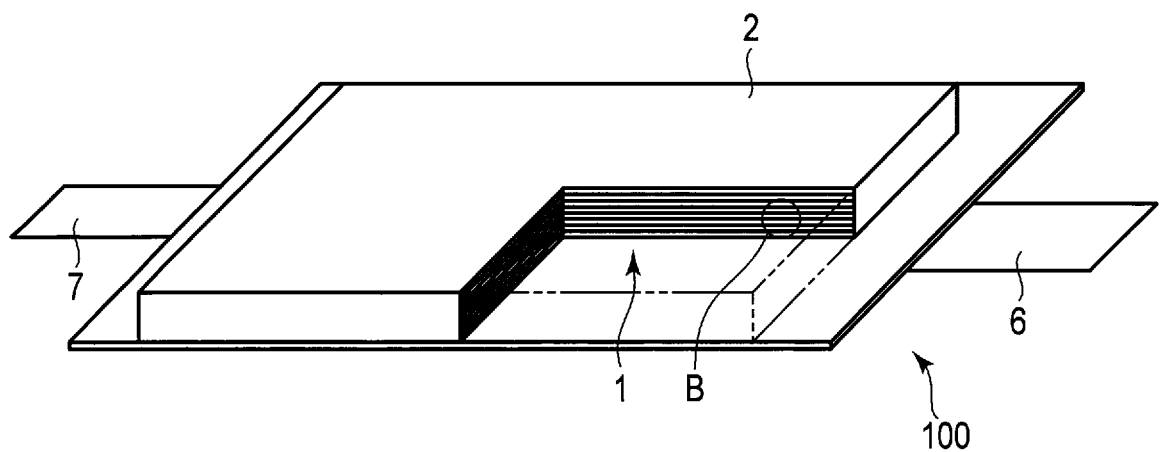
FIG. 3 is a partially cutaway perspective view schematically showing another example of the secondary battery according to the first embodiment.
Figure 4:
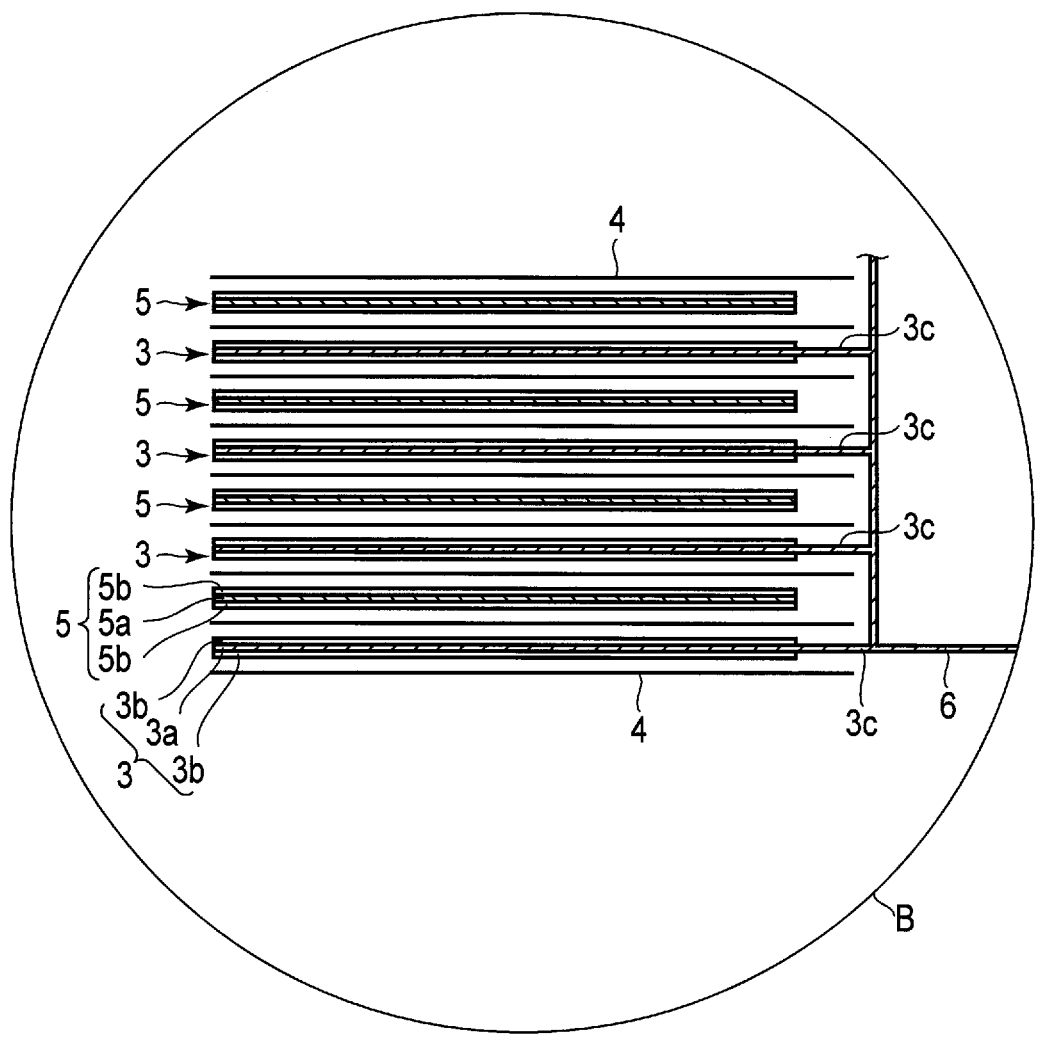
FIG. 4 is an enlarged cross-sectional view of a B portion of the secondary battery shown in FIG. 3.

FIG. 3 is a partially cut-away perspective view schematically showing another example of a secondary battery according to the embodiment. FIG. 4 is an enlarged cross-sectional view of section B of the secondary battery shown in FIG. 3. FIG. 3 and FIG. 4 show an example of the secondary battery 100 used a laminated film container as a container.

The secondary battery 100 shown in FIGS. 3 and 4 includes an electrode group 1 shown in FIGS. 3 and 4, a container member 2 shown in FIG. 3, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 4, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes a plurality of the negative electrodes 3. Each of the negative electrodes 3 includes the negative electrode current collector 3a and the negative electrode active material-containing layers 3b supported on both surfaces of the negative electrode current collector 3a. The electrode group 1 further includes a plurality of the positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at its side a portion 3c where the negative electrode active material-containing layer 3b is not supported on any surface. This portion 3c serves as a negative electrode tab. As shown in FIG. 4, the portion 3c serving as the negative electrode tab does not overlap the positive electrode 5. A plurality of the negative electrode tabs (portions 3c) are electrically connected to the belt-like negative electrode terminal 6. A leading end of the belt-like negative electrode terminal 6 is drawn to the outside from a container member 2.

Although not shown, the positive electrode current collector 5a of each of the positive electrodes 5 includes at its side a portion where the positive electrode active material-containing layer 5b is not supported on any surface. This portion serves as a positive electrode tab. Like the negative electrode tab (portion 3c), the positive electrode tab does not overlap the negative electrode 3. Further, the positive electrode tab is located on the opposite side of the electrode group 1 with respect to the negative electrode tab (portion 3c). The positive electrode tab is electrically connected to the belt-like positive electrode terminal 7. A leading end of the belt-like positive electrode terminal 7 is located on the opposite side of the negative electrode terminal 6 and drawn to the outside from the container member 2.

The secondary battery according to the embodiment may constitute a battery module. The battery module includes a plurality of the secondary batteries according to the embodiment.

In the battery module according to the embodiment, individual unit cells may be arranged to be electrically connected in series or in parallel, or may be arranged in combination of series connection and parallel connection.

An example of the battery module according to the embodiment will be described with reference to drawings.

Figure 5:
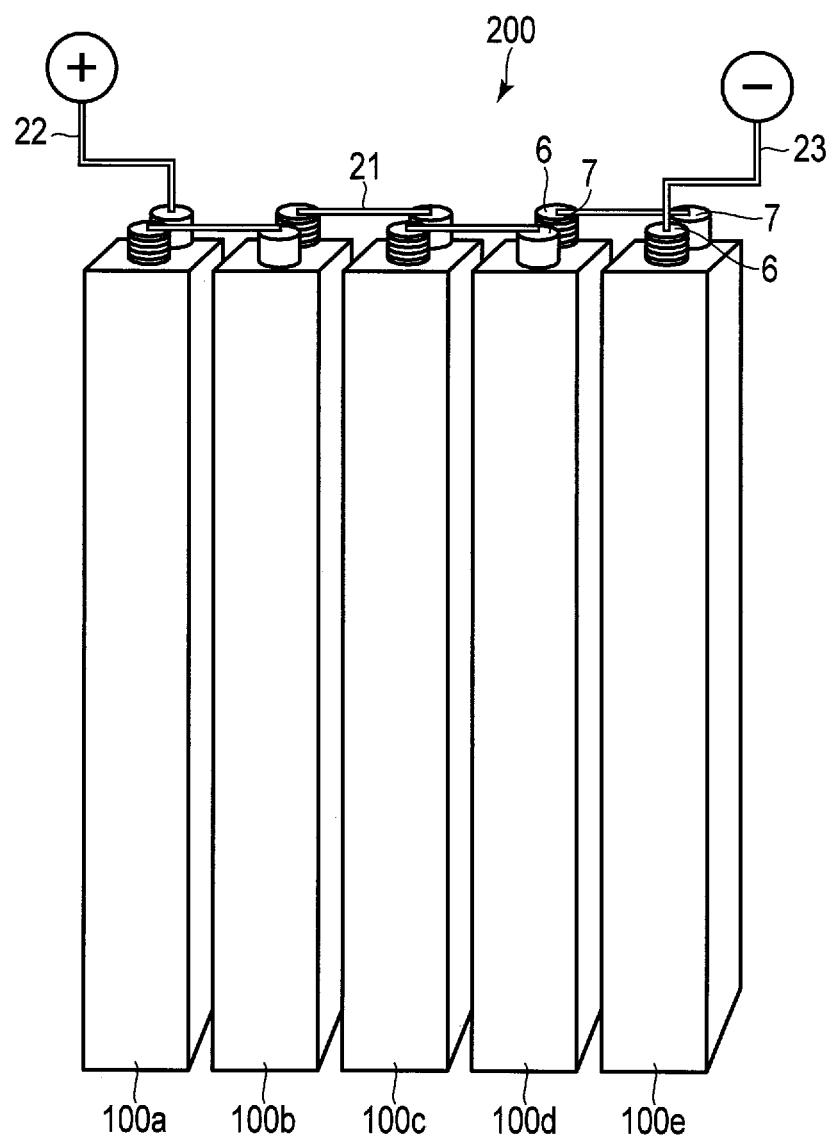
FIG. 5 is a perspective view schematically showing an example of a battery module according to the first embodiment.

FIG. 5 is a perspective view schematically showing an example of the battery module according to the embodiment. A battery module 200 shown in FIG. 5 includes five single-batteries 100a to 100e, four bus bars 21, a positive electrode-side lead 22, and a negative electrode-side lead 23. Each of the five single-batteries 100a to 100e is a secondary battery according to the embodiment.

A bus bar 21 connects, for example, a negative electrode terminal 6 of a unit cell 100a and a positive electrode terminal 7 of a unit cell 100b adjacent to the unit cell 100a. Thus, the five unit cells 100 are connected in series by the four bus bars 21. Namely, a battery module 200 shown in FIG. 5 is a five cell series-connected battery module.

As shown in FIG. 5, the positive electrode terminal 7 of the unit cell 100a located at the left end among the five unit cells 100a to 100e is connected to the positive electrode side lead 22 for external connection. The negative electrode terminal 6 of the unit cell 100e located at the right end among the five unit cells 100a to 100e is connected to the negative electrode side lead 23 for external connection.

According to the first embodiment, a secondary battery is provided. The secondary battery includes a positive electrode including a positive electrode active material, a negative electrode including a negative electrode active material, and an aqueous electrolyte. The negative electrode includes an additive resin including a hydroxyl group unit and a first unit. The first unit consists of at least one of a butyral unit and an acetal unit. A content ratio of a content of the first unit contained in the additive resin to a content of the hydroxyl group unit contained in the additive resin is in the range of 1.2 to 18. Since the secondary battery can suppress the electrolysis of water in the negative electrode, the secondary battery is excellent in long-life characteristics.

Second Embodiment

According to the second embodiment, a battery pack is provided. The battery pack includes the secondary battery according to the first embodiment. The battery pack may include the secondary battery according to the second embodiment or may include a battery module constituted of a plurality of the secondary batteries.

The battery pack according to the second embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the second embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the second embodiment will be described with reference to the drawings.

Figure 6:
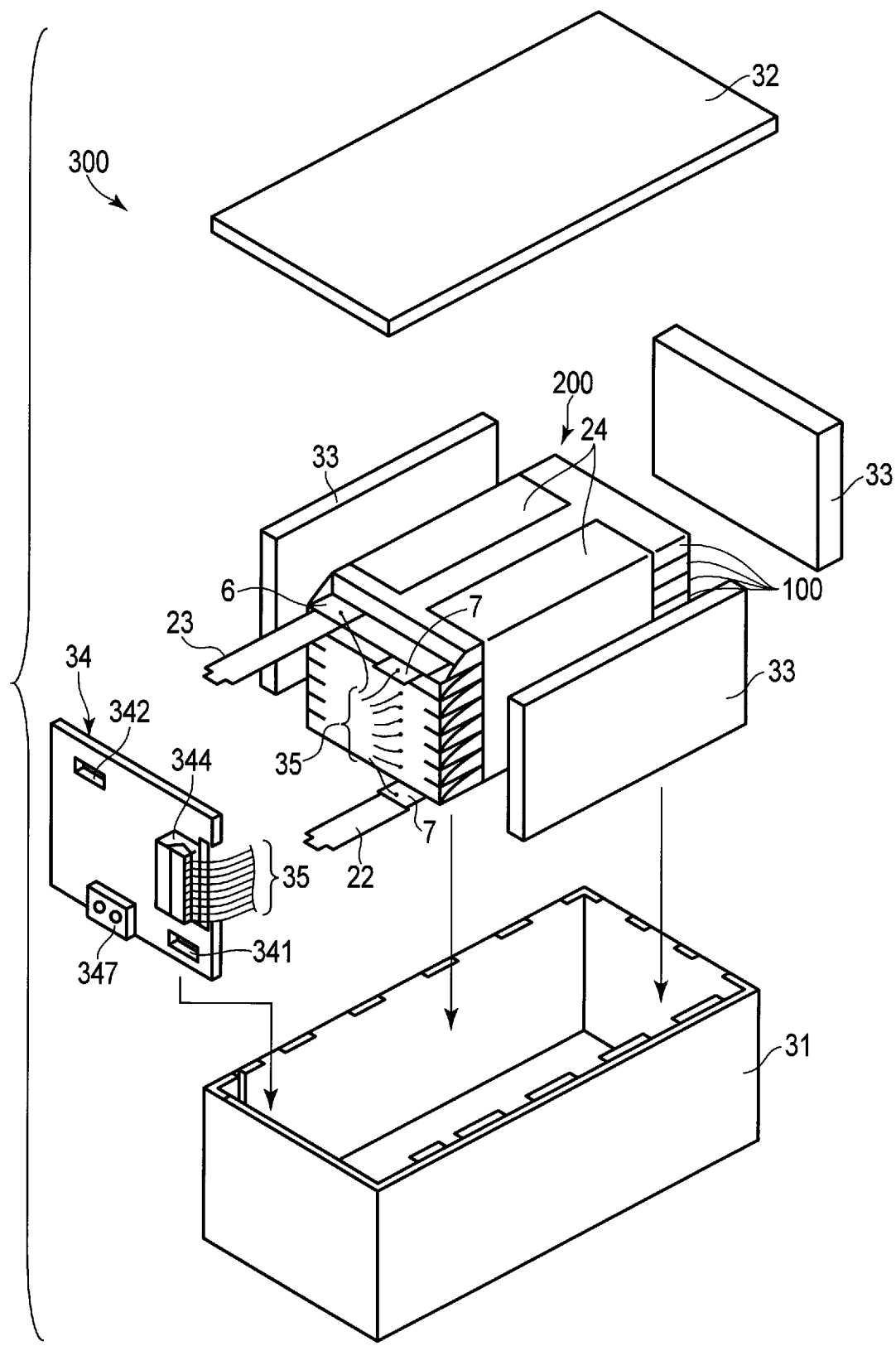
FIG. 6 is an exploded perspective view schematically showing an example of a battery pack according to a second embodiment.
Figure 7:
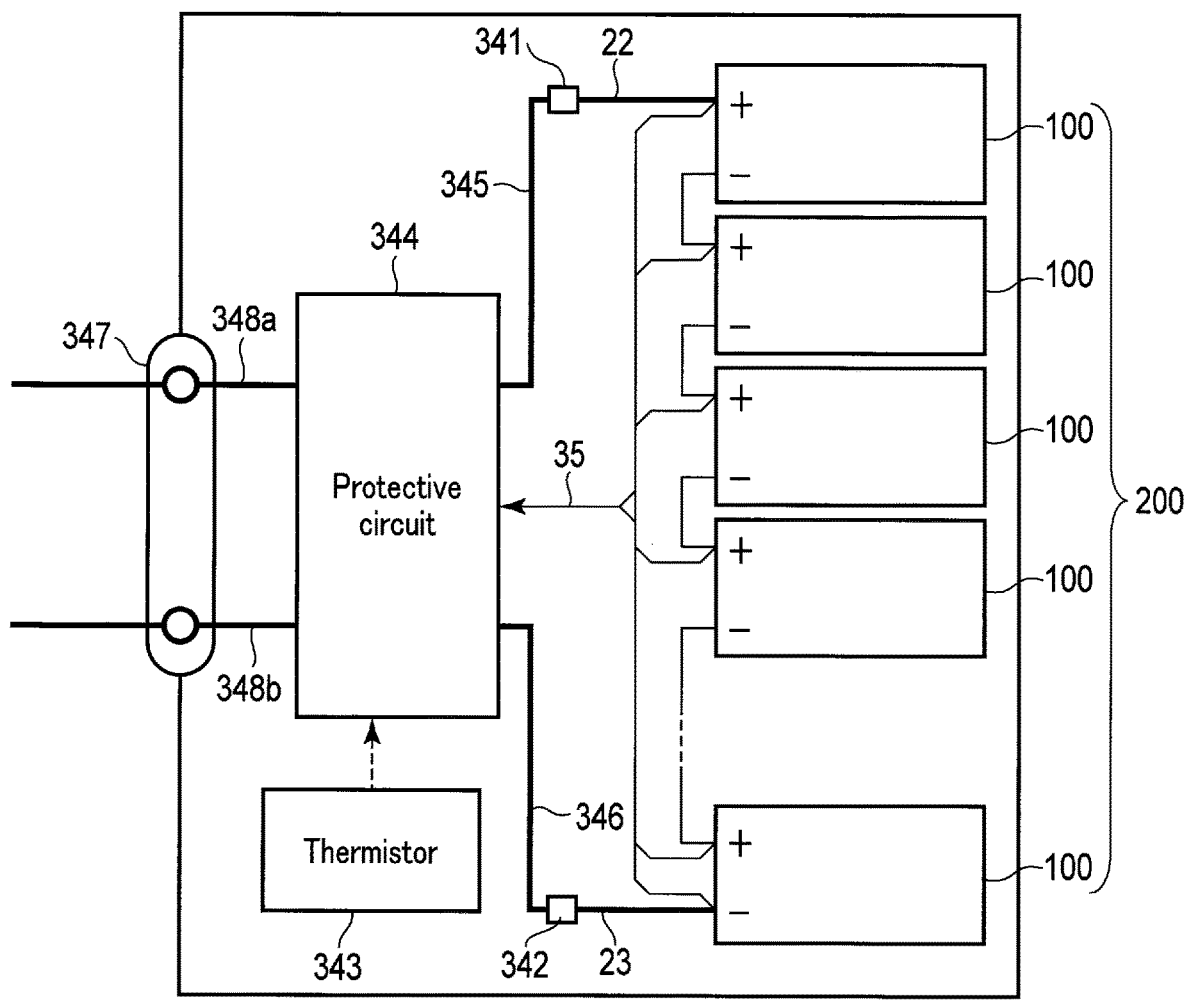
FIG. 7 is a block diagram showing an example of an electric circuit of the battery pack shown in FIG. 6.

FIG. 6 is an exploded perspective view schematically showing an example of the battery pack according to the second embodiment. FIG. 7 is a block diagram showing an example of an electric circuit of the battery pack shown in FIG. 6.

A battery pack 300 shown in FIGS. 6 and 7 includes a housing container 31, a lid 32, protective sheets 33, a battery module 200, a printed wiring board 34, wires 35, and an insulating plate (not shown).

The housing container 31 shown in FIG. 6 is a square bottomed container having a rectangular bottom surface. The housing container 31 is configured to be capable of storing the protective sheets 33, the battery module 200, the printed wiring board 34, and the wires 35. The lid 32 has a rectangular shape. The lid 32 covers the housing container 31 to store the battery module 200 and so on. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and an adhesive tape 24.

At least one of the plural single-batteries 100 is a secondary battery according to the first embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 7. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape 24 fastens the plural single-batteries 100. The plural single-batteries 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

A printed wiring board 34 is disposed on the one inner surface along the short-side direction of inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One main surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through-hole. By inserting the other end of the positive electrode-side lead 22 into the though-hole, the positive electrode-side connector 341 and the positive electrode-side lead 22 become electrically connected. The negative electrode-side connector 342 is provided with a through-hole. By inserting the other end of the negative electrode-side lead 23 into the though-hole, the negative electrode-side connector 342 and the negative electrode-side lead 23 become electrically connected.

The thermistor 343 is fixed to one main surface of the printed wiring board 34. The thermistor 343 detects the temperature of each single-battery 100 and transmits detection signals to the protective circuit 344.

The external power distribution terminal 347 is fixed to the other main surface of the printed wiring board 34. The external power distribution terminal 347 is electrically connected to device(s) that exists outside the battery pack 300.

The protective circuit 344 is fixed to the other main surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction, facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external devices, based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 is a signal indicating detection of over-charge, over-discharge, and overcurrent of the single-battery (single-batteries) 100. When detecting over-charge or the like for each of the single batteries 100, the battery voltage may be detected, or a positive electrode potential or negative electrode potential may be detected. In the latter case, a lithium electrode to be used as a reference electrode may be inserted into each single battery 100.

Note that, as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used, for example, in applications where excellent cycle performance is demanded when a large current is extracted. More specifically, the battery pack is used as, for example, a power source for electronic devices, a stationary battery, or an onboard battery for vehicles. An example of the electronic device is a digital camera. The battery pack 300 is particularly favorably used as an onboard battery.

The battery pack according to the second embodiment includes the secondary battery according to the first embodiment. Thus, the battery pack according to the second embodiment is excellent in charge-and-discharge efficiency, self-discharge performance, and long-life characteristics.

Third Embodiment

According to the third embodiment, a vehicle is provided. The vehicle includes the battery pack according to the second embodiment.

In the vehicle according to the third embodiment, the battery pack is configured to collect regenerative energy of the power of the vehicle. The vehicle can include a mechanism (regenerator) configured to convert kinetic energy of the vehicle into regenerative energy.

Examples of the vehicle include two- to four-wheeled hybrid electric automobiles, two- to four-wheeled electric automobiles, electric assist bicycles, and railway cars.

In the vehicle, the installing position of the battery pack is not particularly limited. For example, the battery pack may be installed in the engine compartment of the vehicle, in rear parts of the vehicle, or under seats.

The vehicle may be equipped with a plurality of battery packs. In this case, the battery packs may be electrically connected in series, may be electrically connected in parallel, or may be electrically connected in a combination of series connection and parallel connection.

An example of the vehicle according to the third embodiment is explained below, with reference to the drawings.

Figure 8:
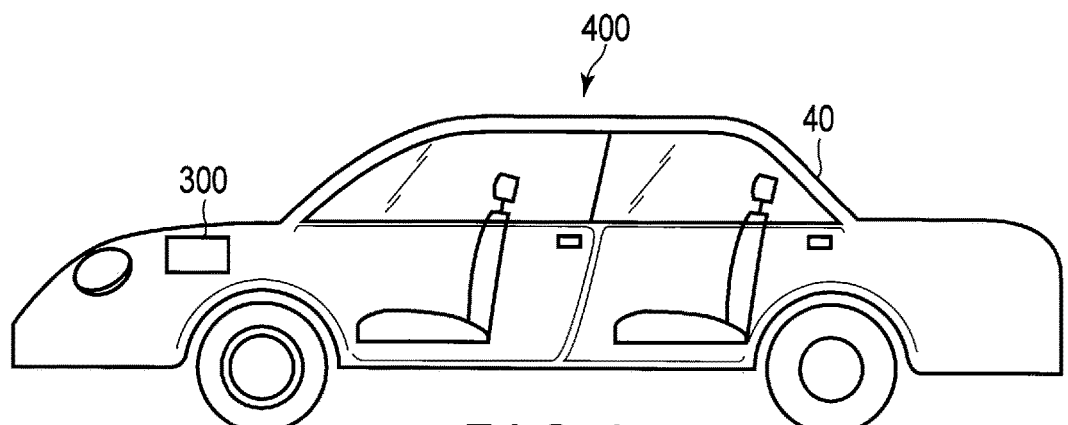
FIG. 8 is a cross-sectional view schematically showing an example of a vehicle according to a third embodiment.

FIG. 8 is a cross-sectional view schematically showing an example of a vehicle according to the third embodiment.

A vehicle 400, shown in FIG. 8 includes a vehicle body 40 and a battery pack 300 according to the second embodiment. In FIG. 8, the vehicle 400 is a four-wheeled automobile.

This vehicle 400 may have plural battery packs 300 installed. In such a case, the battery packs 300 may be connected in series, connected in parallel, or connected in a combination of in-series connection and in-parallel connection.

An example is shown in FIG. 8, where the battery pack 300 is installed in an engine compartment located at the front of the vehicle body 40. As described above, the battery pack 300 may be installed, for example, in rear sections of the vehicle body 40, or under a seat. The battery pack 300 may be used as a power source of the vehicle 400. The battery pack 300 can also recover regenerative energy of power of the vehicle 400.

The vehicle according to the third embodiment includes the battery pack according to the second embodiment. Thus, according to the present embodiment, it is possible to provide a vehicle equipped with a battery pack having excellent charge-and-discharge efficiency, self-discharge performance, and long-life characteristics.

Fourth Embodiment

According to the fourth embodiment, a stationary power supply is provided. The stationary power supply is mounted with the battery pack according to the second embodiment. Note that instead of the battery pack according to the second embodiment, the stationary power supply may have the secondary battery or the battery module according to the first embodiment.

Figure 9:
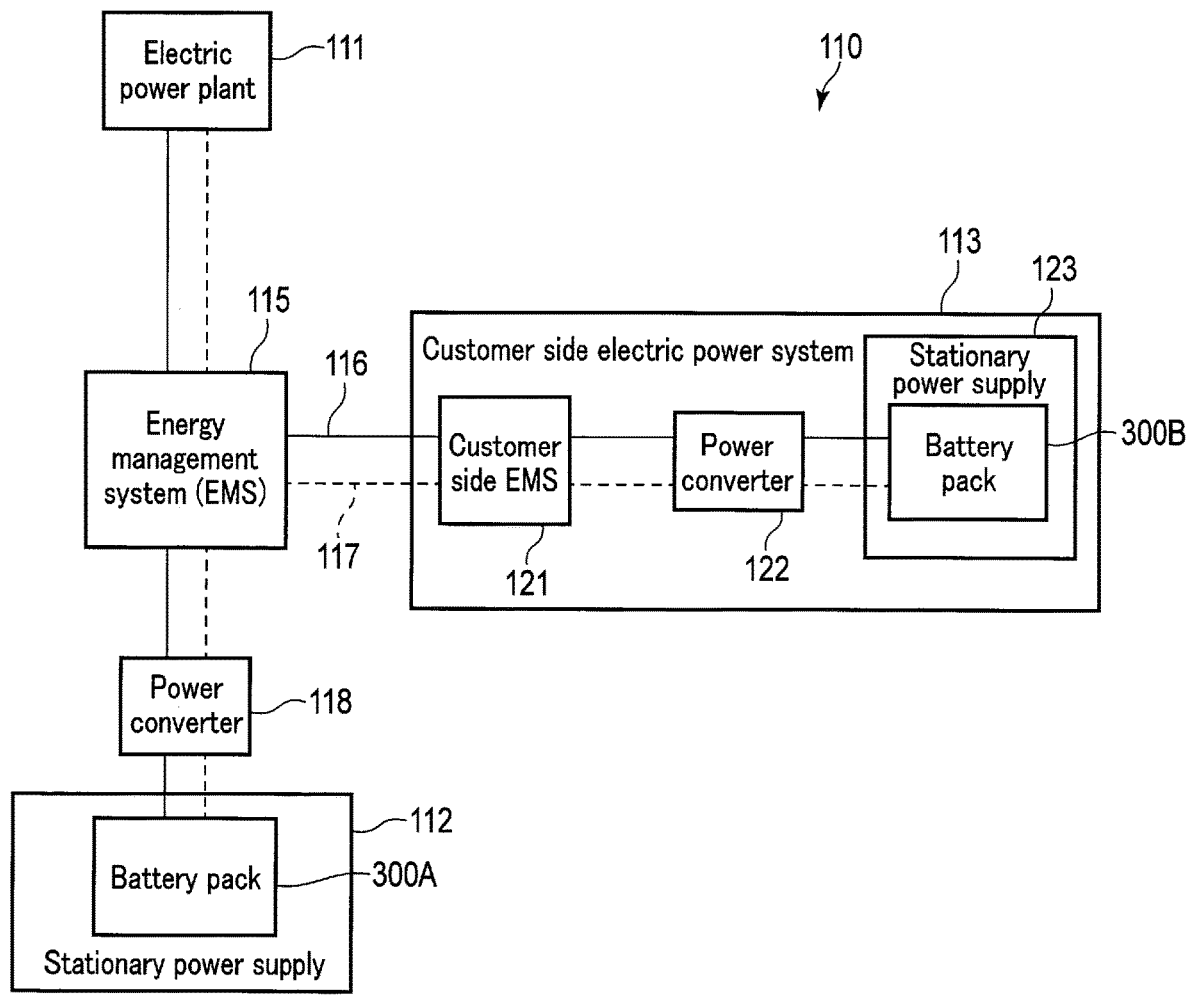
FIG. 9 is a block diagram showing an example of a system including a stationary power supply according to a fourth embodiment.

FIG. 9 is a block diagram showing an example of a system including a stationary power supply according to the fourth embodiment. FIG. 9 is a diagram showing an application example to stationary power supplies 112, 123 as an example of use of battery packs 300A, 300B according to the second embodiment. In the example shown in FIG. 9, a system 110 in which the stationary power supplies 112, 123 are used is shown. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant ill. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 300B is installed in the stationary power supply 123. The customer side EMS 121 performs control to stabilize the customer side electric power system 113.

Electric power from the electric power plant 111 and electric power from the battery pack 300A are supplied to the customer side electric power system 113 through the electric power network 116. The battery pack 300B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric vehicle. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

The stationary power supply according to the fourth embodiment includes the battery pack according to the second embodiment. Thus, according to the present embodiment, it is possible to provide a stationary power supply equipped with a battery pack having excellent charge-and-discharge efficiency, self-discharge performance, and long-life characteristics.

EXAMPLES

Examples are explained below. The embodiments are not limited to Examples described below.

Example 1

<Production of Positive Electrode>
A positive electrode was produced as follows.

First, a positive electrode active material, a conductive agent, and a binder were dispersed in an N-methyl-2-pyrrolidone (NMP) solvent to prepare a slurry. The ratios of the conductive agent and the binder in the positive electrode active material-containing layer were 10 parts by weight and 10 parts by weight, respectively, with respect to 100 parts by weight of the positive electrode active material. As the positive electrode active material, a lithium manganese composite oxide ($LiMn_2O_4$) having a spinel structure and an average particle size of 10 μm was used. The lithium ion insertion/extraction potential of the lithium manganese composite oxide was 3.5 V (vs. $Li/Li^+$) to 4.2 V (vs. $Li/Li^+$). As the conductive agent, a graphite powder was used. As the binder, polyvinylidene fluoride (PVdF) was used.

Next, the prepared slurry was applied to both surfaces of a positive electrode current collector, and the coatings were dried, thereby forming a positive electrode active material-containing layer. As the positive electrode current collector, a Ti foil having a thickness of 12 μm was used. Next, the positive electrode current collector and the positive electrode active material-containing layer were pressed to produce a positive electrode.

<Production of Negative Electrode>
A negative electrode was produced as follows.

First, a negative electrode active material, a conductive agent, and a binder were dispersed in an NMP solvent to prepare a slurry. The ratios of the conductive agent and the binder in the negative electrode active material-containing layer were 10 parts by weight and 1 part by weight, respectively, with respect to 100 parts by weight of the negative electrode active material. As the negative electrode active material, a lithium titanium oxide ($Li_4Ti_5O_{12}$) powder having an average secondary particle size (diameter) of 15 μm was used. The lithium ion insertion/extraction potential of the lithium titanium oxide was 1.5 V (vs. $Li/Li^+$) to 1.7 V (vs. $Li/Li^+$). As the conductive agent, a graphite powder was used. As the binder, a polyvinyl butyral (PVB) resin was used. The PVB resin was a copolymer made of a butyral unit, a hydroxyl group unit, and an acetyl group unit. The content of the butyral unit contained in the PVB resin was 70 mol %, the content of the hydroxyl group unit was 25 mol %, and the content of the acetyl group unit was 5 mol %. Hereinafter, the PVB resin containing the butyral unit, the hydroxyl group unit, and the acetyl group unit in an amount of 70 mol %, 25 mol %, and 5 mol %, respectively, may be referred to as polyvinyl butyral A.

Next, the prepared slurry was applied to both surfaces of a negative electrode current collector, and the coatings were dried, thereby forming a negative electrode active material-containing layer. As the negative electrode current collector, a Ti foil having a thickness of 50 μm was used. Here, when applying the slurry to the Ti foil, for a portion located in the outermost layer of the electrode group in the negative electrode to be produced, the slurry was applied to only one surface of the Ti foil. For the remaining portions, the slurry was applied to both surfaces of the Ti foil. Next, the negative electrode current collector and the negative electrode active material-containing layer were pressed to produce a negative electrode.

<Production of Electrode Group>
The positive electrode produced as described above, a LATP ($Li_{1+x}Al_xTi_{2-x}(PO_4)_3$; $0.1 \leq x \leq 0.4$) sheet having a NASICON type framework with a thickness of 200 μm as a separator, the negative electrode produced as described above, and another LATP sheet were laminated in this order to obtain a laminated body. Next, the laminated body was stacked such that the LATP sheet was located in the outermost layer, thereby producing an electrode group. The obtained electrode group was stored in a thin metal can made of stainless steel having a thickness of 0.25 mm. Note that as the metal can, a can in which a valve configured to leak a gas when the internal pressure became 2 atm or more was placed was used.

<Preparation of Aqueous Electrolyte>

Lithium chloride (LiCl) and lithium sulfate ($Li_2SO_4$) were dissolved in water to obtain a liquid aqueous electrolyte. In the aqueous electrolyte, the mol concentration of LiCl was 3 mol/L, and the mol concentration of $Li_2SO_4$ was 0.25 mol/L.

<Production of Secondary Battery and Initial Charge-and-Discharge>

The liquid aqueous electrolyte was poured into the aforementioned metal can container storing the electrode group, thereby producing a secondary battery. Next, the secondary battery was left stand in a 25° C. environment for 24 hours. After that, the secondary battery was submitted for initial charge-and-discharge in a 25° C. environment. In the initial charge-and-discharge, first, constant current charge was performed by a current of 5 A until the voltage of the secondary battery reached 2.8 V. Next, constant current discharge was performed by a current of 1 A until the voltage reached 2.1 V. Additionally, in the initial charge-and-discharge, the capacity of the secondary battery was confirmed.

Example 2

A secondary battery was produced in the same manner as in Example 1 except that a positive electrode produced as described below was used.

First, a positive electrode active material, a conductive agent, and a binder were dispersed in an N-methyl-2-pyrrolidone (NMP) solvent to prepare a slurry. The ratios of the conductive agent and the binder in the positive electrode active material-containing layer were 10 parts by weight and 1 part by weight, respectively, with respect to 100 parts by weight of the positive electrode active material. As the positive electrode active material, a lithium manganese composite oxide ($LiMn_2O_4$) having a spinel structure and an average particle size of 10 μm was used. The lithium ion insertion/extraction potential of the lithium manganese composite oxide was 3.5 V (vs. $Li/Li^+$) to 4.2 V (vs. $Li/Li^+$). As the conductive agent, a graphite powder was used. As the binder, polyvinyl butyral A was used.

Next, the prepared slurry was applied to both surfaces of a positive electrode current collector, and the coatings were dried, thereby forming a positive electrode active material-containing layer. As the positive electrode current collector, a Ti foil having a thickness of 12 μm was used. Next, the positive electrode current collector and the positive electrode active material-containing layer were pressed to produce a positive electrode.

Example 3

A secondary battery was produced in the same manner as in Example 1 except that a negative electrode produced as described below was used. Specifically, a negative electrode was produced by using the negative electrode active material particles in which a coating film containing a PVB resin was formed on the surface by the following method.

A lithium titanium oxide ($Li_4Ti_5O_{12}$) powder having an average secondary particle size (diameter) of 15 μm was mixed with a 0.5 wt % ethanol solution of the PVB resin and stirred with an ultrasonic homogenizer for 10 minutes. The PVB resin used was polyvinyl butyral A.

After the stirring, the mixed solution was centrifuged, the solid matter was isolated, then washed several times with ethanol, and dried to obtain a lithium titanium oxide powder whose surface was covered with the PVB resin.

A negative electrode was produced in the same manner as in Example 1 except that this powder was used as a negative electrode active material and polyvinylidene fluoride (PVdF) was used as a binder.

Example 4

A secondary battery was produced in the same manner as in Example 1 except that a positive electrode produced as described below was used. Specifically, a positive electrode was produced by using the positive electrode active material particles in which a coating film containing a PVB resin was formed on the surface. Covering of the particle surfaces with the PVB resin was carried out by the method described in Example 3 except that lithium manganese composite oxide particles (positive electrode active material particles) having an average particle size of 10 μm were used in place of lithium titanium oxide particles.

Example 5

A secondary battery was produced in the same manner as in Example 1 except that the following PVB resin was used as the binder contained in the negative electrode.

The PVB resin used was a copolymer made of a butyral unit, a hydroxyl group unit, and an acetyl group unit. The content of the butyral unit contained in the PVB resin was 60 mol %, the content of the hydroxyl group unit was 38 mol %, and the content of the acetyl group unit was 2 mol %. Hereinafter, the PVB resin containing the butyral unit, the hydroxyl group unit, and the acetyl group unit in an amount of 60 mol %, 38 mol %, and 2 mol %, respectively, may be referred to as polyvinyl butyral B.

Example 6

A secondary battery was produced in the same manner as in Example 1 except that the following polyvinyl acetal (PVA) resin was used as the binder contained in the negative electrode.

The PVA resin used was a copolymer made of an acetal unit, a hydroxyl group unit, and an acetyl group unit. The content of the acetal unit contained in the PVA resin was 70 mol %, the content of the hydroxyl group unit was 25 mol %, and the content of the acetyl group unit was 5 mold.

Example 7

A secondary battery was produced in the same manner as in Example 3 except that a negative electrode was produced using negative electrode active material particles having a coating film containing a PVA resin on its surface. The PVA resin used was the same as used in Example 6.

Example 8

A secondary battery was produced in the same manner as in Example 1 except that as negative electrode active materials, a lithium titanium oxide ($Li_4Ti_5O_{12}$) powder having an average secondary particle size (diameter) of 15 μm and a rutile $TiO_2$ powder having an average secondary particle size (diameter) of 15 μm were used at a weight ratio of 80:20. The lithium ion insertion/extraction potential of rutile $TiO_2$ is, for example, 1.1 V (vs. $Li/Li^+$) to 1.3 V (vs. $Li/Li^+$).

Example 9

A secondary battery was produced in the same manner as in Example 3 except that as negative electrode active materials, a lithium titanium oxide ($Li_4Ti_5O_{12}$) powder having an average secondary particle size (diameter) of 15 µm and a rutile $TiO_2$ powder having an average secondary particle size (diameter) of 15 µm were used at a weight ratio of 80:20.

Example 10

A secondary battery was produced in the same manner as in Example 1 except that $Nb_2TiO_7$ having an average secondary particle size (diameter) of 13 µm was used as the negative electrode active material. The lithium ion insertion/extraction potential of $Nb_2TiO_7$ particles is, for example, 1.3 V (vs. $Li/Li^+$) to 1.5 V (vs. $Li/Li^+$).

Example 11

A secondary battery was produced in the same manner as in Example 3 except that $Nb_2TiO_7$ having an average secondary particle size (diameter) of 13 µm was used as the negative electrode active material.

Example 12

A secondary battery was produced in the same manner as in Example 1 except that $Li_2Na_2Ti_6O_{14}$ having an average secondary particle size (diameter) of 15 µm was used as the negative electrode active material. The lithium ion insertion/extraction potential of $Li_2Na_2Ti_6O_{14}$ particles is, for example, 1.2 V (vs. $Li/Li^+$) to 1.4 V (vs. $Li/Li^+$).

Example 13

A secondary battery was produced in the same manner as in Example 3 except that $Li_2Na_2Ti_6O_{14}$ having an average secondary particle size (diameter) of 15 µm was used as the negative electrode active material.

Example 14

A secondary battery was produced in the same manner as in Example 2 except that lithium phosphate ($LiMnPO_4$) having an olivine structure with an average secondary particle size (diameter) of 12 µm was used as the positive electrode active material. The lithium ion insertion/extraction potential of $LiMnPO_4$ is, for example, 2.9 V (vs. $Li/Li^+$) to 3.6 V (vs. $Li/Li^+$).

Example 15

A secondary battery was produced in the same manner as in Example 4 except that lithium phosphate ($LiMnPO_4$) having an olivine structure with an average secondary particle size (diameter) of 12 µm was used as the positive electrode active material.

Example 16

A secondary battery was produced in the same manner as in Example 1 except that the following PVB resin was used as the binder contained in the negative electrode.

The PVB resin used was a copolymer made of a butyral unit, a hydroxyl group unit, and an acetyl group unit. The content of the butyral unit contained in the PVB resin was 55 mol %, the content of the hydroxyl group unit was 43 mol %, and the content of the acetyl group unit was 2 mol %. Hereinafter, the PVB resin containing the butyral unit, the hydroxyl group unit, and the acetyl group unit in an amount of 55 mol %, 43 mol %, and 2 mol %, respectively, may be referred to as polyvinyl butyral C.

Example 17

A secondary battery was produced in the same manner as in Example 3 except that polyvinyl butyral C was used instead of polyvinyl butyral A.

Example 18

The negative electrode active material particles in which a coating film containing a PVB resin was formed on the surface were produced in the same manner as described in Example 3. A secondary battery was produced in the same manner as described in Example 1 except that the negative electrode active material particles were used as the negative electrode active material.

Example 19

A secondary battery was produced in the same manner as in Example 1 except that when the negative electrode was produced, the ratios of the conductive agent and the binder were 10 parts by weight and 0.5 part by weight, respectively, with respect to 100 parts by weight of the negative electrode active material.

Example 20

A secondary battery was produced in the same manner as in Example 1 except that when the negative electrode was produced, the ratios of the conductive agent and the binder were 10 parts by weight and 3 parts by weight, respectively, with respect to 100 parts by weight of the negative electrode active material.

Example 21

A secondary battery was produced in the same manner as in Example 2 except that $LiCoO_2$ having an average secondary particle size (diameter) of 12 µm was used as the positive electrode active material. The lithium ion insertion/extraction potential of $LiCoO_2$ is, for example, 3.6 V (vs. $Li/Li^+$) to 4.2 V (vs. $Li/Li^+$).

Example 22

A secondary battery was produced in the same manner as in Example 4 except that $LiCoO_2$ having an average secondary particle size (diameter) of 12 µm was used as the positive electrode active material.

Comparative Example 1

A secondary battery was produced in the same manner as in Example 1 except that PVdF was used instead of the PVB resin was used as the binder contained in the negative electrode. That is, in the secondary battery according to Comparative Example 1, neither the negative electrode nor the positive electrode contained the additive resin.

Comparative Example 2

A secondary battery was produced in the same manner as in Example 2 except that PVdF was used instead of the PVB resin was used as the binder contained in the negative electrode. That is, in the secondary battery according to Comparative Example 2, although the positive electrode contained the additive resin, the negative electrode did not contain the additive resin.

Examples 23 to 44

The secondary batteries of Examples 23 to 44 was produced in the same manner as in Examples 1-22, respectively, except that a Zn foil having a thickness of 50 μm was used as the negative electrode current collector.

Comparative Examples 3 and 4

The secondary batteries of Comparative Examples 3 and 4 was produced in the same manner as in Comparative Examples 1 and 2, respectively, except that a Zn foil having a thickness of 50 μm was used as the negative electrode current collector.

<Evaluation of Average Operating Voltage>

An average operating voltage of each of the secondary batteries of Examples 1 to 22 and Comparative Examples 1 and 2, obtained when the battery was subjected to the initial charge-and-discharge, was evaluated. Those results are shown in Table 2 below.

<Evaluation of Charge-and-Discharge Efficiency, Self-Discharge Performance, and Long-Life Characteristics>

The charge-and-discharge efficiency, the self-discharge performance, and the long-life characteristics of each of the secondary batteries according to Examples 1 to 22 and Comparative Examples 1 and 2 were evaluated as follows. Those results are shown in Table 2 below.

After the secondary battery was charged at a constant current of 3 A in a 25° C. environment until the voltage reached 2.8 V, 30 minutes of resting time was provided, and then the secondary battery was discharged until the voltage reached 1.5 V. After that, another 30 minutes of resting time was provided. One cycle from charging to the end of the second resting time was defined as one charge-and-discharge cycle. This charge-and-discharge cycle was repeated 50 times. Next, the discharge capacity and charge capacity of the secondary battery after the 50 cycles were measured, and the charge-and-discharge efficiency (discharge capacity/charge capacity*100) (%) was calculated.

After the 51st charging operation, a holding time for 24 hours is provided, and self-discharge efficiency (charge capacity after holding for 24 hours/charge capacity before holding*100) (%) was calculated from the charge capacity before holding and the charge capacity after holding for 24 hours. The self-discharge efficiency is an index of the self-discharge performance.

The charge-and-discharge cycle under the aforementioned conditions was repeated further, and the discharge capacity at the 100th cycle was measured. As the ratio between this value and the discharge capacity at the first cycle, the capacity retention ratio (discharge capacity at the 100th cycle/discharge capacity at the first cycle*100) (%) was calculated. The value of the capacity retention ratio is an index of the long-life characteristics.

<Nuclear Magnetic Resonance Spectroscopy (NMR)>

$^1$H-NMR measurement was performed on the negative electrode and the positive electrode included in each of the secondary batteries according to Examples 1 to 22 and Comparative Examples 1 and 2 by the method described in the first embodiment. Thus, in the negative electrode active material-containing layer or the positive electrode active material-containing layer, the ratio of the weight of the additive resin to the weight of the active material was measured. Further, the composition of the additive resin used as the binder and/or the surface covering material was confirmed. Those results are shown in Table 1.

<Evaluation of Average Operating Voltage>

An average operating voltage of each of the secondary batteries of Examples 23 to 44 and Comparative Examples 3 and 4, obtained when the battery was subjected to the initial charge-and-discharge, was evaluated. Those results are shown in Table 4 below.

<Evaluation of Charge-and-Discharge Efficiency, Self-Discharge Performance, and Long-Life Characteristics>

The charge-and-discharge efficiency, the self-discharge performance, and the long-life characteristics of each of the secondary batteries according to Examples 23 to 44 and Comparative Examples 3 and 4 were evaluated in the same manner as in Examples 1-22 and Comparative Examples 1 and 2. Those results are shown in Table 4 below.

<Nuclear Magnetic Resonance Spectroscopy (NMR)>

$^1$H-NMR measurement was performed on the negative electrode and the positive electrode included in each of the secondary batteries according to Examples 23 to 44 and Comparative Examples 3 and 4 by the method described in the first embodiment. Thus, in the negative electrode active material-containing layer or the positive electrode active material-containing layer, the ratio of the weight of the additive resin to the weight of the active material was measured. Further, the composition of the additive resin used as the binder and/or the surface covering material was confirmed. Those results are shown in Table 3.

TABLE 1

| | | Negative electrode | | | |
| --- | --- | --- | --- | --- | --- |
| | Negative electrode active material | Surface coating film (type of additive resin) | Binder | Additive resin content (parts by weight) | Content ratio in additive resin |
| Example 1 | $Li_4Ti_5O_{12}$ | Absent | Polyvinyl butyral A | 1 | 2.8 |
| Example 2 | $Li_4Ti_5O_{12}$ | Absent | Polyvinyl butyral A | 1 | 2.8 |
| Example 3 | $Li_4Ti_5O_{12}$ | Present (polyvinyl butyral A) | Polyvinylidene fluoride | 0.9 | 2.8 |
| Example 4 | $Li_4Ti_5O_{12}$ | Absent | Polyvinyl butyral A | 1 | 2.8 |
| Example 5 | $Li_4Ti_5O_{12}$ | Absent | Polyvinyl butyral B | 1 | 1.6 |
| Example 6 | $Li_4Ti_5O_{12}$ | Absent | Polyvinyl acetal | 1 | 2.8 |
| Example 7 | $Li_4Ti_5O_{12}$ | Present (polyvinyl acetal) | Polyvinylidene fluoride | 0.9 | 2.8 |

TABLE 1-continued

| | | | | | |
|---|---|---|---|---|---|
| Example 8 | $Li_4Ti_5O_{12}/TiO_2$ (rutile type) 80/20 (wt %) | Absent | Polyvinyl butyral A | 1 | 2.8 |
| Example 9 | $Li_4Ti_5O_{12}/TiO_2$ (rutile type) 80/20 (wt %) | Present (polyvinyl butyral A) | Polyvinylidene fluoride | 0.9 | 2.8 |
| Example 10 | $Nb_2TiO_7$ | Absent | Polyvinyl butyral A | 1 | 2.8 |
| Example 11 | $Nb_2TiO_7$ | Present (polyvinyl butyral A) | Polyvinylidene fluoride | 0.9 | 2.8 |
| Example 12 | $Li_2Na_2Ti_6O_{14}$ | Absent | Polyvinyl butyral A | 1 | 2.8 |
| Example 13 | $Li_2Na_2Ti_6O_{14}$ | Present (polyvinyl butyral A) | Polyvinylidene fluoride | 0.9 | 2.8 |
| Example 14 | $Li_4Ti_5O_{12}$ | Absent | Polyvinyl butyral A | 1 | 2.8 |
| Example 15 | $Li_4Ti_5O_{12}$ | Absent | Polyvinyl butyral A | 1 | 2.8 |
| Example 16 | $Li_4Ti_5O_{12}$ | Absent | Polyvinyl butyral C | 1 | 1.3 |
| Example 17 | $Li_4Ti_5O_{12}$ | Present (polyvinyl butyral C) | Polyvinylidene fluoride | 0.9 | 1.3 |
| Example 18 | $Li_4Ti_5O_{12}$ | Present (polyvinyl butyral A) | Polyvinyl butyral A | 2 | 2.8 |
| Example 19 | $Li_4Ti_5O_{12}$ | Absent | Polyvinyl butyral A | 0.5 | 2.8 |
| Example 20 | $Li_4Ti_5O_{12}$ | Absent | Polyvinyl butyral A | 3 | 2.8 |
| Example 21 | $Li_4Ti_5O_{12}$ | Absent | Polyvinyl butyral A | 1 | 2.8 |
| Example 22 | $Li_4Ti_5O_{12}$ | Absent | Polyvinyl butyral A | 1 | 2.8 |
| Comparative Example 1 | $Li_4Ti_5O_{12}$ | Absent | Polyvinylidene fluoride | 0 | — |
| Comparative Example 2 | $Li_4Ti_5O_{12}$ | Absent | Polyvinylidene fluoride | 0 | — |

| | Positive electrode | | | | |
|---|---|---|---|---|---|
| | Positive electrode active material | Surface coating film (type of additive resin) | Binder | Additive resin content (parts by weight) | Content ratio in additive resin |
| Example 1 | $LiMn_2O_4$ | Absent | Polyvinylidene fluoride | 0 | — |
| Example 2 | $LiMn_2O_4$ | Absent | Polyvinyl butyral A | 1 | 2.8 |
| Example 3 | $LiMn_2O_4$ | Absent | Polyvinylidene fluoride | 0 | — |
| Example 4 | $LiMn_2O_4$ | Present (polyvinyl butyral A) | Polyvinylidene fluoride | 0.9 | 2.8 |
| Example 5 | $LiMn_2O_4$ | Absent | Polyvinylidene fluoride | 0 | — |
| Example 6 | $LiMn_2O_4$ | Absent | Polyvinylidene fluoride | 0 | — |
| Example 7 | $LiMn_2O_4$ | Absent | Polyvinylidene fluoride | 0 | — |
| Example 8 | $LiMn_2O_4$ | Absent | Polyvinylidene fluoride | 0 | — |
| Example 9 | $LiMn_2O_4$ | Absent | Polyvinylidene fluoride | 0 | — |
| Example 10 | $LiMn_2O_4$ | Absent | Polyvinylidene fluoride | 0 | — |
| Example 11 | $LiMn_2O_4$ | Absent | Polyvinylidene fluoride | 0 | — |
| Example 12 | $LiMn_2O_4$ | Absent | Polyvinylidene fluoride | 0 | — |
| Example 13 | $LiMn_2O_4$ | Absent | Polyvinylidene fluoride | 0 | — |
| Example 14 | $LiMnPO_4$ | Absent | Polyvinyl butyral A | 1 | 2.8 |
| Example 15 | $LiMnPO_4$ | Present (polyvinyl butyral A) | Polyvinylidene fluoride | 0.9 | 2.8 |
| Example 16 | $LiMn_2O_4$ | Absent | Polyvinylidene fluoride | 0 | — |
| Example 17 | $LiMn_2O_4$ | Absent | Polyvinylidene fluoride | 0 | — |
| Example 18 | $LiMn_2O_4$ | Absent | Polyvinylidene fluoride | 0 | — |
| Example 19 | $LiMn_2O_4$ | Absent | Polyvinylidene fluoride | 0 | — |
| Example 20 | $LiMn_2O_4$ | Absent | Polyvinylidene fluoride | 0 | — |
| Example 21 | $LiCoO_2$ | Absent | Polyvinyl butyral A | 1 | 2.8 |
| Example 22 | $LiCoO_2$ | Present (polyvinyl butyral A) | Polyvinylidene fluoride | 0.9 | 2.8 |
| Comparative Example 1 | $LiMn_2O_4$ | Absent | Polyvinylidene fluoride | 0 | — |
| Comparative Example 2 | $LiMn_2O_4$ | Absent | Polyvinyl butyral A | 1 | 2.8 |

Polyvinyl butyral A . . . butyral unit 70 mol %, hydroxyl group unit 25 mol %, acetyl group unit 5 mol %
Polyvinyl butyral B . . . butyral unit 60 mol %, hydroxyl group unit 38 mol %, acetyl group unit 2 mol %
Polyvinyl butyral C . . . butyral unit 55 mol %, hydroxyl group unit 43 mol %, acetyl group unit 2 mol %
Polyvinyl acetal . . . acetal unit 70 mol %, hydroxyl group unit 25 mol %, acetyl group unit 5 mol %

TABLE 2

| | Battery characteristics | | | |
|---|---|---|---|---|
| | Average operating voltage | Charge and discharge efficiency | Self-discharge efficiency | Capacity retention ratio |
| Example 1 | 2.42 V | 98% | 74% | 98% |
| Example 2 | 2.43 V | 96% | 72% | 97% |
| Example 3 | 2.42 V | 94% | 77% | 96% |
| Example 4 | 2.42 V | 94% | 74% | 97% |

TABLE 2-continued

| | Battery characteristics | | | |
|---|---|---|---|---|
| | Average operating voltage | Charge and discharge efficiency | Self-discharge efficiency | Capacity retention ratio |
| Example 5 | 2.43 V | 96% | 75% | 96% |
| Example 6 | 2.43 V | 96% | 73% | 95% |
| Example 7 | 2.43 V | 93% | 75% | 96% |
| Example 8 | 2.53 V | 96% | 77% | 97% |
| Example 9 | 2.51 V | 95% | 79% | 95% |
| Example 10 | 2.64 V | 96% | 72% | 95% |
| Example 11 | 2.64 V | 95% | 74% | 94% |
| Example 12 | 2.72 V | 96% | 71% | 97% |
| Example 13 | 2.71 V | 94% | 72% | 96% |
| Example 14 | 1.89 V | 98% | 75% | 98% |
| Example 15 | 1.88 V | 96% | 72% | 98% |
| Example 16 | 2.42 V | 91% | 41% | 97% |
| Example 17 | 2.43 V | 91% | 45% | 96% |
| Example 18 | 2.42 V | 88% | 72% | 100% |
| Example 19 | 2.43 V | 86% | 52% | 94% |
| Example 20 | 2.42 V | 85% | 71% | 100% |
| Example 21 | 2.45 V | 97% | 75% | 98% |
| Example 22 | 2.45 V | 96% | 72% | 98% |
| Comparative Example 1 | 2.43 V | 96% | 18% | 71% |
| Comparative Example 2 | 2.43 V | 96% | 18% | 73% |

TABLE 3

| | Negative electrode | | | | |
|---|---|---|---|---|---|
| | Negative electrode active material | Surface coating film (type of additive resin) | Binder | Additive resin content (parts by weight) | Content ratio in additive resin |
| Example 23 | $Li_4Ti_5O_{12}$ | Absent | Polyvinyl butyral A | 1 | 2.8 |
| Example 24 | $Li_4Ti_5O_{12}$ | Absent | Polyvinyl butyral A | 1 | 2.8 |
| Example 25 | $Li_4Ti_5O_{12}$ | Present (polyvinyl butyral A) | Polyvinylidene fluoride | 0.9 | 2.8 |
| Example 26 | $Li_4Ti_5O_{12}$ | Absent | Polyvinyl butyral A | 1 | 2.8 |
| Example 27 | $Li_4Ti_5O_{12}$ | Absent | Polyvinyl butyral B | 1 | 1.6 |
| Example 28 | $Li_4Ti_5O_{12}$ | Absent | Polyvinyl acetal | 1 | 2.8 |
| Example 29 | $Li_4Ti_5O_{12}$ | Present (polyvinyl acetal) | Polyvinylidene fluoride | 0.9 | 2.8 |
| Example 30 | $Li_4Ti_5O_{12}/TiO_2$ (rutile type) 80/20 (wt %) | Absent | Polyvinyl butyral A | 1 | 2.8 |
| Example 31 | $Li_4Ti_5O_{12}/TiO_2$ (rutile type) 80/20 (wt %) | Present (polyvinyl butyral A) | Polyvinylidene fluoride | 0.9 | 2.8 |
| Example 32 | $Nb_2TiO_7$ | Absent | Polyvinyl butyral A | 1 | 2.8 |
| Example 33 | $Nb_2TiO_7$ | Present (polyvinyl butyral A) | Polyvinylidene fluoride | 0.9 | 2.8 |
| Example 34 | $Li_2Na_2Ti_6O_{14}$ | Absent | Polyvinyl butyral A | 1 | 2.8 |
| Example 35 | $Li_2Na_2Ti_6O_{14}$ | Present (polyvinyl butyral A) | Polyvinylidene fluoride | 0.9 | 2.8 |
| Example 36 | $Li_4Ti_5O_{12}$ | Absent | Polyvinyl butyral A | 1 | 2.8 |
| Example 37 | $Li_4Ti_5O_{12}$ | Absent | Polyvinyl butyral A | 1 | 2.8 |
| Example 38 | $Li_4Ti_5O_{12}$ | Absent | Polyvinyl butyral C | 1 | 1.3 |
| Example 39 | $Li_4Ti_5O_{12}$ | Present (polyvinyl butyral C) | Polyvinylidene fluoride | 0.9 | 1.3 |
| Example 40 | $Li_4Ti_5O_{12}$ | Present (polyvinyl butyral A) | Polyvinyl butyral A | 2 | 2.8 |
| Example 41 | $Li_4Ti_5O_{12}$ | Absent | Polyvinyl butyral A | 0.5 | 2.8 |
| Example 42 | $Li_4Ti_5O_{12}$ | Absent | Polyvinyl butyral A | 3 | 2.8 |
| Example 43 | $Li_4Ti_5O_{12}$ | Absent | Polyvinyl butyral A | 1 | 2.8 |
| Example 44 | $Li_4Ti_5O_{12}$ | Absent | Polyvinyl butyral A | 1 | 2.8 |
| Comparative Example 3 | $Li_4Ti_5O_{12}$ | Absent | Polyvinylidene fluoride | 0 | — |
| Comparative Example 4 | $Li_4Ti_5O_{12}$ | Absent | Polyvinylidene fluoride | 0 | — |

| | Positive electrode | | | | |
|---|---|---|---|---|---|
| | Positive electrode active material | Surface coating film (type of additive resin) | Binder | Additive resin content (parts by weight) | Content ratio in additive resin |
| Example 23 | $LiMn_2O_4$ | Absent | Polyvinylidene fluoride | 0 | — |
| Example 24 | $LiMn_2O_4$ | Absent | Polyvinyl butyral A | 1 | 2.8 |
| Example 25 | $LiMn_2O_4$ | Absent | Polyvinylidene fluoride | 0 | — |
| Example 26 | $LiMn_2O_4$ | Present (polyvinyl butyral A) | Polyvinylidene fluoride | 0.9 | 2.8 |
| Example 27 | $LiMn_2O_4$ | Absent | Polyvinylidene fluoride | 0 | — |
| Example 28 | $LiMn_2O_4$ | Absent | Polyvinylidene fluoride | 0 | — |
| Example 29 | $LiMn_2O_4$ | Absent | Polyvinylidene fluoride | 0 | — |
| Example 30 | $LiMn_2O_4$ | Absent | Polyvinylidene fluoride | 0 | — |
| Example 31 | $LiMn_2O_4$ | Absent | Polyvinylidene fluoride | 0 | — |

TABLE 3-continued

| | | | | | |
|---|---|---|---|---|---|
| Example 32 | LiMn$_2$O$_4$ | Absent | Polyvinylidene fluoride | 0 | — |
| Example 33 | LiMn$_2$O$_4$ | Absent | Polyvinylidene fluoride | 0 | — |
| Example 34 | LiMn$_2$O$_4$ | Absent | Polyvinylidene fluoride | 0 | — |
| Example 35 | LiMn$_2$O$_4$ | Absent | Polyvinylidene fluoride | 0 | — |
| Example 36 | LiMnPO$_4$ | Absent | Polyvinyl butyral A | 1 | 2.8 |
| Example 37 | LiMnPO$_4$ | Present (polyvinyl butyral A) | Polyvinylidene fluoride | 0.9 | 2.8 |
| Example 38 | LiMn$_2$O$_4$ | Absent | Polyvinylidene fluoride | 0 | — |
| Example 39 | LiMn$_2$O$_4$ | Absent | Polyvinylidene fluoride | 0 | — |
| Example 40 | LiMn$_2$O$_4$ | Absent | Polyvinylidene fluoride | 0 | — |
| Example 41 | LiMn$_2$O$_4$ | Absent | Polyvinylidene fluoride | 0 | — |
| Example 42 | LiMn$_2$O$_4$ | Absent | Polyvinylidene fluoride | 0 | — |
| Example 43 | LiCoO$_2$ | Absent | Polyvinyl butyral A | 1 | 2.8 |
| Example 44 | LiCoO$_2$ | Present (polyvinyl butyral A) | Polyvinylidene fluoride | 0.9 | 2.8 |
| Comparative Example 3 | LiMn$_2$O$_4$ | Absent | Polyvinylidene fluoride | 0 | — |
| Comparative Example 4 | LiMn$_2$O$_4$ | Absent | Polyvinyl butyral A | 1 | 2.8 |

Polyvinyl butyral A . . . butyral unit 70 mol %, hydroxyl group unit 25 mol %, acetyl group unit 5 mol %
Polyvinyl butyral B . . . butyral unit 60 mol %, hydroxyl group unit 38 mol %, acetyl group unit 2 mol %
Polyvinyl butyral C . . . butyral unit 55 mol %, hydroxyl group unit 43 mol %, acetyl group unit 2 mol %
Polyvinyl acetal . . . acetal unit 70 mol %, hydroxyl group unit 25 mol %, acetyl group unit 5 mol %

TABLE 4

| | Battery characteristics | | | |
|---|---|---|---|---|
| | Average operating voltage | Charge and discharge efficiency | Self-discharge efficiency | Capacity retention ratio |
| Example 23 | 2.42 V | 99% | 85% | 98% |
| Example 24 | 2.43 V | 98% | 81% | 98% |
| Example 25 | 2.42 V | 97% | 86% | 96% |
| Example 26 | 2.42 V | 97% | 86% | 97% |
| Example 27 | 2.43 V | 98% | 86% | 97% |
| Example 28 | 2.43 V | 97% | 84% | 95% |
| Example 29 | 2.43 V | 96% | 86% | 95% |
| Example 30 | 2.53 V | 98% | 87% | 98% |
| Example 31 | 2.51 V | 98% | 90% | 95% |
| Example 32 | 2.64 V | 99% | 82% | 97% |
| Example 33 | 2.64 V | 98% | 83% | 94% |
| Example 34 | 2.72 V | 98% | 82% | 96% |
| Example 35 | 2.71 V | 98% | 82% | 96% |
| Example 36 | 1.89 V | 99% | 86% | 97% |
| Example 37 | 1.88 V | 99% | 84% | 98% |
| Example 38 | 2.42 V | 96% | 66% | 97% |
| Example 39 | 2.43 V | 96% | 67% | 97% |
| Example 40 | 2.42 V | 92% | 81% | 100% |
| Example 41 | 2.43 V | 93% | 70% | 95% |
| Example 42 | 2.42 V | 93% | 80% | 99% |
| Example 43 | 2.45 V | 99% | 86% | 97% |
| Example 44 | 2.45 V | 97% | 81% | 98% |
| Comparative Example 3 | 2.43 V | 98% | 31% | 73% |
| Comparative Example 4 | 2.43 V | 98% | 32% | 72% |

In Table 1, a column with a notation "additive resin content (parts by weight)" indicates the parts by weight of the additive resin with respect to 100 parts by weight of the active material contained in the negative electrode active material-containing layer or the positive electrode active material-containing layer. A column with a notation "content ratio in additive resin" indicates the content ratio of the content of the first unit contained in the additive resin to the content of the hydroxyl group unit contained in the additive resin in the negative electrode or the positive electrode. That is, this value is calculated by the formula (the content of the first unit contained in the additive resin)/(the content of the hydroxyl group unit contained in the additive resin).

As shown in Table 1, the lithium secondary batteries of Examples 1 to 22 were able to achieve excellent charge-and-discharge efficiency, self-discharge performance, and long-life characteristics. For example, these secondary batteries had high residual capacities even after the holding time of 24 hours from the full charge state.

As shown in Examples 1, 5, and 16, even when the content ratio of the content of the first unit in the additive resin to the content of the hydroxyl group unit was changed from 2.8 to 1.6 or 1.3, excellent charge-and-discharge efficiency, self-discharge performance, and long-life characteristics could be achieved.

As shown in Examples 6 and 7, even when polyvinyl acetal was used in place of polyvinyl butyral as an additive resin, excellent charge-and-discharge efficiency, self-discharge performance, and long-life characteristics could be achieved.

As shown in Examples 1 to 22, when the ratio of the part by weight of the additive resin to 100 parts by weight of the negative electrode active material is from 0.5 part by weight to 3 parts by weight, excellent charge-and-discharge efficiency, self-discharge performance, and long-life characteristics could be achieved. In particular, when the ratio was in the range of 0.9 part by weight to 2 parts by weight, more excellent charge-and-discharge efficiency, self-discharge performance, and long-life characteristics could be achieved.

As shown in Examples 1 and 3 and Examples 8 to 13, even when the type of the negative electrode active material was changed from lithium titanium oxide to niobium titanium oxide or sodium titanium oxide, while sufficient self-discharge performance could be achieved, a high average operating voltage could be achieved.

As shown in Examples 2 and 4 and Examples 14 and 15, even when the type of the positive electrode active material was changed from lithium manganese oxide to a lithium phosphate compound having an olivine structure, or, as shown in Examples 21 and 22, even when the type of the positive electrode active material was changed from lithium manganese oxide to lithium cobalt composite oxide, excellent charge-and-discharge efficiency, self-discharge performance, and long-life characteristics could be achieved.

The secondary batteries according to Comparative Examples 1 and 2 in which the negative electrode contained no additive resin had remarkably low self-discharge performance and capacity retention ratio. This is considered to be because the electrolysis of water in the negative electrode was not suppressed.

Examples 23-44 using a Zn foil were more excellent particularly in self-discharge performance as compared to Examples 1-22 using a Ti foil. Also with regard to charge-and-discharge efficiency and capacity retention ratio, Examples 23-44 were equivalent to or more excellent as compared to Examples 1-22.

According to at least one embodiment and Example described above, a secondary battery is provided. The secondary battery includes a positive electrode, a negative electrode, and an aqueous electrolyte. The positive electrode includes a positive electrode active material. The negative electrode includes a negative electrode active material and an additive resin containing a hydroxyl group unit and a first unit. The first unit consists of at least one of a butyral unit and an acetal unit. A content ratio of a content of the first unit contained in the additive resin to a content of the hydroxyl group unit contained in the additive resin is in a range of 1.2 to 18. Since the secondary battery can suppress the electrolysis of water in the negative electrode, the secondary battery is excellent in long-life characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising: a positive electrode comprising a positive electrode active material, a negative electrode comprising a negative electrode active material, and an aqueous electrolyte,
   wherein the negative electrode comprises an additive resin comprising a hydroxyl group unit and a first unit, the first unit consists of at least one of a butyral unit and an acetal unit, and
   a content ratio of a content of the first unit of the additive resin to a content of the hydroxyl group unit of the additive resin is in a range of 1.2 to 18.

2. The secondary battery according to claim 1, wherein the additive resin comprises at least one selected from the group consisting of a polyvinyl butyral satisfying the content ratio and a polyvinyl acetal satisfying the content ratio.

3. The secondary battery according to claim 1, wherein a ratio of a part by weight of the additive resin to 100 part by weight of the negative electrode active material is in a range of 0.1 part by weight to 3 part by weight.

4. The secondary battery according to claim 1, wherein the negative electrode comprises negative electrode active material particles comprising the negative electrode active material, and
the additive resin covers at least a portion of surfaces of the negative electrode active material particles.

5. The secondary battery according to claim 1, wherein the content ratio is in a range of 1.5 to 10.

6. The secondary battery according to claim 1, wherein the additive resin is a thermoplastic resin.

7. The secondary battery according to claim 1, wherein the negative electrode active material comprises a compound whose lithium ion insertion/extraction potential is from 1 V (vs. Li/Li$^+$) to 3 V (vs. Li/Li$^+$) with respect to a potential based on metal lithium.

8. The secondary battery according to claim 1, wherein the positive electrode active material comprises a compound whose lithium ion insertion/extraction potential is from 2.5 V (vs. Li/Li$^+$) to 5.5 V (vs. Li/Li$^+$) with respect to a potential based on metal lithium.

9. A battery pack comprising the secondary battery according to claim 1.

10. The battery pack according to claim 9, further comprising:
an external power distribution terminal; and
a protective circuit.

11. The battery pack according to claim 9, which comprises plural of the secondary battery, wherein the plural of the secondary battery are electrically connected in series, in parallel, or in combination thereof.

12. A vehicle comprising the battery pack according to claim 9.

13. The vehicle according to claim 12, which comprises a mechanism configured to convert kinetic energy of the vehicle into regenerative energy.

14. A stationary power supply comprising the battery pack according to claim 9.

* * * * *